US012309634B2

(12) United States Patent
Jian et al.

(10) Patent No.: US 12,309,634 B2
(45) Date of Patent: May 20, 2025

(54) DOWNLINK CONGESTION CONTROL OPTIMIZATION

(71) Applicant: QUALCOMM Incorporated, San Diego, CA (US)

(72) Inventors: Yubing Jian, Atlanta, GA (US); Arvind Vardarajan Santhanam, San Diego, CA (US); Ertugrul Necdet Ciftcioglu, North Reading, MA (US); Arnaud Meylan, San Diego, CA (US); Reza Shahidi, San Diego, CA (US); Supratik Bhattacharjee, San Diego, CA (US); Gautham Hariharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/698,513

(22) Filed: Mar. 18, 2022

(65) Prior Publication Data
US 2023/0300671 A1 Sep. 21, 2023

(51) Int. Cl.
*H04W 28/02* (2009.01)
(52) U.S. Cl.
CPC ... *H04W 28/0289* (2013.01); *H04W 28/0236* (2013.01); *H04W 28/0284* (2013.01)
(58) Field of Classification Search
CPC ........ H04L 47/11; H04L 47/12; H04W 28/02; H04W 28/0236; H04W 28/0284; H04W 28/0289
See application file for complete search history.

(56) References Cited

U.S. PATENT DOCUMENTS 6,622,172 B1 * 9/2003 Tam ...................... H04L 1/1854
709/233
7,068,606 B1 * 6/2006 Ma ...................... H04L 12/5602
370/236

(Continued)

FOREIGN PATENT DOCUMENTS

CN 110581808 A 12/2019
CN 118872248 A * 10/2024 ............... H04L 47/11
WO WO-2023177479 A1 * 9/2023 ............... H04L 47/11

OTHER PUBLICATIONS

International Search Report and Written Opinion—PCT/US2023/011626—ISA/EPO—Apr. 26, 2023.

*Primary Examiner* — Eric Nowlin
(74) *Attorney, Agent, or Firm* — Holland & Hart LLP

(57) ABSTRACT

Methods, systems, and devices for wireless communication are described. In some wireless communications systems, a receiving device, such as a user equipment (UE), may reduce packet congestion associated with communications between the receiving device and a transmitting device, such as a server, via a radio access network (RAN). The receiving device may measure congestion metrics associated with receiving data packets from the transmitting device via the RAN. The congestion metrics may include RAN congestion metrics and transport or application layer congestion metrics associated with the network connection between the receiving device and the transmitting device. The receiving device may estimate packet congestion at the receiving device according to the measured congestion metrics. The receiving device may modify connection parameters of the network connection based on the estimated packet congestion. The receiving device may communicate with the transmitting device over the network connection in accordance with the modified connection parameters.

22 Claims, 15 Drawing Sheets

(56) References Cited

U.S. PATENT DOCUMENTS

| | | | | |
|---|---|---|---|---|
| 7,248,564 B1* | 7/2007 | Grosdidier | H04L 47/283 | 370/235 |
| 7,916,642 B2* | 3/2011 | Chowdury | H04L 47/32 | 370/235 |
| 8,259,728 B2* | 9/2012 | Mizrachi | H04L 47/34 | 370/474 |
| 8,392,558 B1* | 3/2013 | Ahuja | G06F 9/505 | 709/227 |
| 8,553,540 B2* | 10/2013 | Mehrotra | H04L 47/30 | 370/252 |
| 8,661,322 B2* | 2/2014 | Julian | H04L 1/1867 | 714/774 |
| 8,761,019 B2* | 6/2014 | Chowdury | H04L 47/11 | 370/236 |
| 8,761,202 B2* | 6/2014 | Sivakumar | H04L 69/161 | 709/227 |
| 8,787,378 B2* | 7/2014 | Lee | H04L 47/193 | 370/392 |
| 8,953,453 B1* | 2/2015 | Xiao | H04L 47/215 | 370/235.1 |
| 9,037,185 B2* | 5/2015 | Tomiyasu | H04W 24/08 | 455/67.11 |
| 9,178,789 B2* | 11/2015 | Zhang | H04L 47/29 | |
| 9,185,587 B2* | 11/2015 | Vangala | H04W 24/08 | |
| 9,419,904 B2* | 8/2016 | Xiao | H04L 67/63 | |
| 9,485,184 B2* | 11/2016 | Mehrotra | H04L 47/25 | |
| 9,548,924 B2* | 1/2017 | Pettit | H04L 49/3009 | |
| 9,742,705 B2* | 8/2017 | Eardley | H04L 47/12 | |
| 9,807,024 B2* | 10/2017 | Shpiner | H04L 47/263 | |
| 9,838,276 B2* | 12/2017 | Pettit | H04L 43/026 | |
| 9,935,859 B2* | 4/2018 | Vangala | H04W 24/08 | |
| 9,979,793 B2* | 5/2018 | Rahman | H04L 43/50 | |
| 10,257,097 B1* | 4/2019 | Kandasamy | H04L 47/12 | |
| 10,440,604 B2* | 10/2019 | Zhang | H04W 28/0284 | |
| 10,547,552 B2* | 1/2020 | Kandasamy | H04L 47/12 | |
| 10,560,382 B2* | 2/2020 | Li | H04L 9/40 | |
| 10,742,555 B1* | 8/2020 | Shalev | H04L 67/563 | |
| 10,873,533 B1* | 12/2020 | Ismailsheriff | H04L 47/27 | |
| 10,917,352 B1* | 2/2021 | Hanes | H04L 69/16 | |
| 10,979,918 B2* | 4/2021 | Barton | H04W 24/04 | |
| 11,064,386 B2* | 7/2021 | Zhang | H04W 28/0289 | |
| 11,082,189 B2* | 8/2021 | Wang | H04L 1/1854 | |
| 11,190,448 B2* | 11/2021 | Mindler | H04L 43/08 | |
| 11,212,227 B2* | 12/2021 | Pan | H04W 52/26 | |
| 11,516,139 B2* | 11/2022 | Ismailsheriff | G06N 20/00 | |
| 11,546,262 B2* | 1/2023 | Hanes | H04L 47/125 | |
| 11,876,719 B2* | 1/2024 | Venkataraman | H04L 47/193 | |
| 11,936,561 B2* | 3/2024 | Pan | H04L 43/16 | |
| 2005/0201414 A1* | 9/2005 | Awais | H04L 65/1101 | 370/468 |
| 2005/0207349 A1* | 9/2005 | Nagami | H04L 41/5009 | 370/241 |
| 2006/0067333 A1* | 3/2006 | Sivakumar | H04L 69/161 | 370/395.52 |
| 2006/0136790 A1* | 6/2006 | Julian | H04L 1/20 | 714/704 |
| 2007/0124425 A1 | 5/2007 | Gross | | |
| 2008/0008092 A1* | 1/2008 | Wang | H04L 47/263 | 370/235 |
| 2009/0080332 A1* | 3/2009 | Mizrachi | H04L 47/12 | 370/236 |
| 2011/0216648 A1* | 9/2011 | Mehrotra | H04L 47/25 | 370/412 |
| 2012/0163385 A1* | 6/2012 | Lee | H04L 47/17 | 370/392 |
| 2013/0044598 A1* | 2/2013 | Zhang | H04L 43/0882 | 370/232 |
| 2013/0279338 A1* | 10/2013 | Mehrotra | H04L 47/25 | 370/235 |
| 2014/0112172 A1* | 4/2014 | Vangala | H04L 43/10 | 370/252 |
| 2014/0162564 A1* | 6/2014 | Tomiyasu | H04W 24/08 | 455/67.11 |
| 2015/0156123 A1* | 6/2015 | Xiao | H04L 47/12 | 370/230 |
| 2015/0163142 A1* | 6/2015 | Pettit | H04L 49/3009 | 370/230 |
| 2015/0222715 A1* | 8/2015 | Rahman | H04L 67/51 | 709/224 |
| 2015/0372949 A1* | 12/2015 | Eardley | H04L 49/3045 | 370/229 |
| 2016/0020983 A1* | 1/2016 | Vangala | H04L 43/0888 | 370/252 |
| 2017/0070919 A1* | 3/2017 | Verger | H04L 65/1083 | |
| 2017/0094620 A1* | 3/2017 | Yago | H04W 56/001 | |
| 2017/0118090 A1* | 4/2017 | Pettit | H04L 67/10 | |
| 2017/0289041 A1* | 10/2017 | Li | H04L 9/40 | |
| 2017/0289054 A1* | 10/2017 | Ohkawa | H04L 43/0841 | |
| 2017/0373950 A1 | 12/2017 | Szilagyi et al. | | |
| 2019/0007873 A1* | 1/2019 | Kumar Parameswarn Rajamma | H04W 36/0085 | |
| 2019/0028537 A1* | 1/2019 | Krishna Singuru | H04L 67/1008 | |
| 2019/0045388 A1* | 2/2019 | Zhang | H04W 28/0231 | |
| 2019/0058666 A1 | 2/2019 | Pudlewski | | |
| 2019/0222520 A1* | 7/2019 | Kandasamy | H04L 47/283 | |
| 2019/0268832 A1* | 8/2019 | Jiang | H04L 5/0094 | |
| 2019/0373675 A1* | 12/2019 | Chari | H04W 88/04 | |
| 2020/0053064 A1* | 2/2020 | Oprisan | H04L 69/16 | |
| 2020/0162944 A1* | 5/2020 | Barton | H04W 24/04 | |
| 2020/0195567 A1* | 6/2020 | Selvidge | H04L 43/0882 | |
| 2020/0221332 A1* | 7/2020 | Zhang | H04W 28/0231 | |
| 2020/0366608 A1* | 11/2020 | Pan | H04L 47/11 | |
| 2020/0382433 A1* | 12/2020 | Klemetti | H04L 47/28 | |
| 2021/0067450 A1* | 3/2021 | Hanes | H04L 47/283 | |
| 2021/0092068 A1* | 3/2021 | Ismailsheriff | H04L 47/283 | |
| 2021/0105659 A1* | 4/2021 | Li | H04L 47/283 | |
| 2021/0144095 A1* | 5/2021 | Hanes | H04L 47/125 | |
| 2021/0160183 A1* | 5/2021 | Mindler | H04W 40/36 | |
| 2021/0235281 A1 | 7/2021 | Magzimof et al. | | |
| 2021/0328930 A1* | 10/2021 | Nikolaidis | H04L 47/127 | |
| 2021/0351985 A1* | 11/2021 | Beran | H04L 65/65 | |
| 2022/0045953 A1* | 2/2022 | Mindler | H04L 43/08 | |
| 2022/0070097 A1* | 3/2022 | Pan | H04L 43/0858 | |
| 2022/0191962 A1* | 6/2022 | Di Girolamo | H04L 5/0053 | |
| 2022/0303854 A1* | 9/2022 | Salkintzis | H04W 36/0044 | |
| 2023/0023893 A1* | 1/2023 | Venkataraman | H04W 28/0273 | |
| 2023/0269183 A1* | 8/2023 | Keung | H04L 47/10 | 370/230 |
| 2023/0300671 A1* | 9/2023 | Jian | H04L 47/11 | 370/229 |

* cited by examiner

DOWNLINK CONGESTION CONTROL OPTIMIZATION

FIELD OF TECHNOLOGY

The following relates to wireless communication, including downlink congestion control optimization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support packet-based communications. For example, a user plane entity of a radio access network (RAN) may transfer data packets from one or more servers (e.g., via a packet-switched network) to wireless devices within the RAN, such as UEs. A network connection between a UE and a server may be established and maintained using a transport layer protocol, such as transmission control protocol (TCP).

SUMMARY

The described techniques relate to improved methods, systems, devices, and apparatuses that support downlink congestion control optimization. For example, the described techniques may provide for a wireless device to detect packet congestion in a network and modify one or more connection parameters to reduce the packet congestion. A wireless device, such as a user equipment (UE), may communicate with a remote or far-end server via a network connection. Packets communicated between the UE and the server may be relayed via a packet-switched network and a radio access network (RAN). In some aspects, portions of the packets may be transmitted over-the-air (OTA) via the RAN and reassembled at the UE. The UE may measure congestion metrics associated with receiving the packets at the UE from the server via the RAN. The congestion metrics may include one or more RAN congestion metrics associated with the RAN and one or more transport layer or application layer metrics associated with the network connection between the UE and the server.

The UE may estimate a packet congestion at the UE based on the measured congestion metrics. In some aspects, the UE may estimate one or more congestion control parameters. The UE may modify one or more connection parameters of the network connection between the UE and the server based on the estimated packet congestion. The UE may communicate with the server over the network connection using the modified connection parameters. The modified connection parameters may reduce a quantity or rate of data packets transmitted at a time, which may reduce the packet congestion, prevent packet loss, and improve throughput.

A method for wireless communication at a data receiver is described. The method may include measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter, estimating a packet congestion at the data receiver according to the measured set of multiple congestion metrics, modifying, based on the estimated packet congestion, one or more connection parameters of the network connection between the data receiver and the data transmitter, and communicating with the data transmitter over the network connection in accordance with the modified connection parameters.

An apparatus for wireless communication at a data receiver is described. The apparatus may include a processor, memory coupled with the processor, and instructions stored in the memory. The instructions may be executable by the processor to cause the apparatus to measure a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter, estimate a packet congestion at the data receiver according to the measured set of multiple congestion metrics, modify, based on the estimated packet congestion, one or more connection parameters of the network connection between the data receiver and the data transmitter, and communicate with the data transmitter over the network connection in accordance with the modified connection parameters.

Another apparatus for wireless communication at a data receiver is described. The apparatus may include means for measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter, means for estimating a packet congestion at the data receiver according to the measured set of multiple congestion metrics, means for modifying, based on the estimated packet congestion, one or more connection parameters of the network connection between the data receiver and the data transmitter, and means for communicating with the data transmitter over the network connection in accordance with the modified connection parameters.

A non-transitory computer-readable medium storing code for wireless communication at a data receiver is described. The code may include instructions executable by a processor to measure a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter, estimate a packet congestion at the data receiver according to the measured set of multiple congestion metrics, modify, based on the estimated packet congestion, one or more connection parameters of the network connection between the data receiver and the data transmitter, and communicate with the data transmitter over the network connection in accordance with the modified connection parameters.

In some examples of the method, apparatuses, and non-transitory computer-readable medium described herein, communicating with the data transmitter may include operations, features, means, or instructions for throttling an acknowledgment rate for packets received over the network connection, where the modified connection parameters include the throttled acknowledgment rate.

In some examples of the method, apparatuses, and non-transitory computer-readable medium described herein, communicating with the data transmitter may include operations, features, means, or instructions for transmitting an acknowledgment to the data transmitter including an indication of an adjusted receiver window size that corresponds to a quantity of data packets and a time period, where the modified connection parameters include the adjusted receiver window size.

Some examples of the method, apparatuses, and non-transitory computer-readable medium described herein may further include operations, features, means, or instructions for receiving, from the data transmitter over the network connection, the quantity of data packets within the time period based on the indication of the adjusted receiver window size.

In some examples of the method, apparatuses, and non-transitory computer-readable medium described herein, estimating the packet congestion at the data receiver may include operations, features, means, or instructions for estimating one or more data transmitter side parameters associated with congestion control, the one or more data transmitter side parameters including one or more of: a congestion window size, a round-trip-time (RTT) between the data receiver and the data transmitter, a bandwidth delay product (BDP), or any combination thereof.

In some examples of the method, apparatuses, and non-transitory computer-readable medium described herein, estimating the packet congestion at the data receiver may include operations, features, means, or instructions for estimating a type of congestion control mechanism at the data transmitter, a state of the congestion control mechanism at the data transmitter, or both based on the estimated one or more data transmitter side parameters.

Some examples of the method, apparatuses, and non-transitory computer-readable medium described herein may further include operations, features, means, or instructions for throttling an acknowledgment rate for packets received over the network connection based on the type of the congestion control mechanism corresponding to a loss-based congestion control mechanism, where the modified connection parameters may include the throttled acknowledgment rate.

In some examples of the method, apparatuses, and non-transitory computer-readable medium described herein, estimating the RTT between the data receiver and the data transmitter may include operations, features, means, or instructions for transmitting, to the data transmitter, a first data packet at a first time, where a transmission control protocol (TCP) header for the first data packet indicates the first time, receiving, from the data transmitter, a second data packet at a second time in response to the first data packet, where a TCP header for the second data packet indicates the first time and the second time, and estimating the RTT based on a difference between the first time and the second time.

In some examples of the method, apparatuses, and non-transitory computer-readable medium described herein, estimating the RTT between the data receiver and the data transmitter may include operations, features, means, or instructions for estimating the RTT based on an auto-regressive analysis of a set of multiple data packets received from the data transmitter.

In some examples of the method, apparatuses, and non-transitory computer-readable medium described herein, estimating the congestion window size may include operations, features, means, or instructions for receiving one or more data packets from the data transmitter during the RTT and estimating the congestion window size based on a quantity of the one or more data packets received during the RTT.

In some examples of the method, apparatuses, and non-transitory computer-readable medium described herein, measuring the set of multiple congestion metrics may include operations, features, means, or instructions for measuring a packet loss rate associated with the data packets and estimating whether the packet loss rate corresponds to OTA communications via the RAN, to the packet congestion, or both.

Some examples of the method, apparatuses, and non-transitory computer-readable medium described herein may further include operations, features, means, or instructions for modifying the one or more connection parameters of the network connection between the data receiver and the data transmitter may be based on estimating that at least a portion of the packet loss rate corresponds to the packet congestion.

Some examples of the method, apparatuses, and non-transitory computer-readable medium described herein may further include operations, features, means, or instructions for receiving, from a network node of the RAN, a congestion notification message indicating a potential overflow of data packets in a buffer of the network node, where estimating the packet congestion at the data receiver may be based on the congestion notification message.

In some examples of the method, apparatuses, and non-transitory computer-readable medium described herein, estimating the packet congestion may include operations, features, means, or instructions for estimating the packet congestion based on a learning model corresponding to a neural network-based machine learning algorithm, a reinforced learning-based machine learning algorithm, a statistical-based algorithm, or any combination thereof, where an input to the learning model includes the set of multiple congestion metrics.

In some examples of the method, apparatuses, and non-transitory computer-readable medium described herein, modifying the one or more connection parameters may include operations, features, means, or instructions for calculating the one or more modified connection parameters based on a learning model corresponding to a neural network-based machine learning algorithm, a reinforced learning-based machine learning algorithm, a statistical-based algorithm, or any combination thereof, where an input to the learning model includes the estimated packet congestion.

In some examples of the method, apparatuses, and non-transitory computer-readable medium described herein, the one or more RAN congestion metrics associated with the RAN include a link rate associated with OTA communications via the RAN and the one or more transport layer or application layer congestion metrics associated with the network connection between the data receiver and the data transmitter include a packet loss, an RTT, a BDP, a TCP header, or any combination thereof.

DETAILED DESCRIPTION

Figure 1:
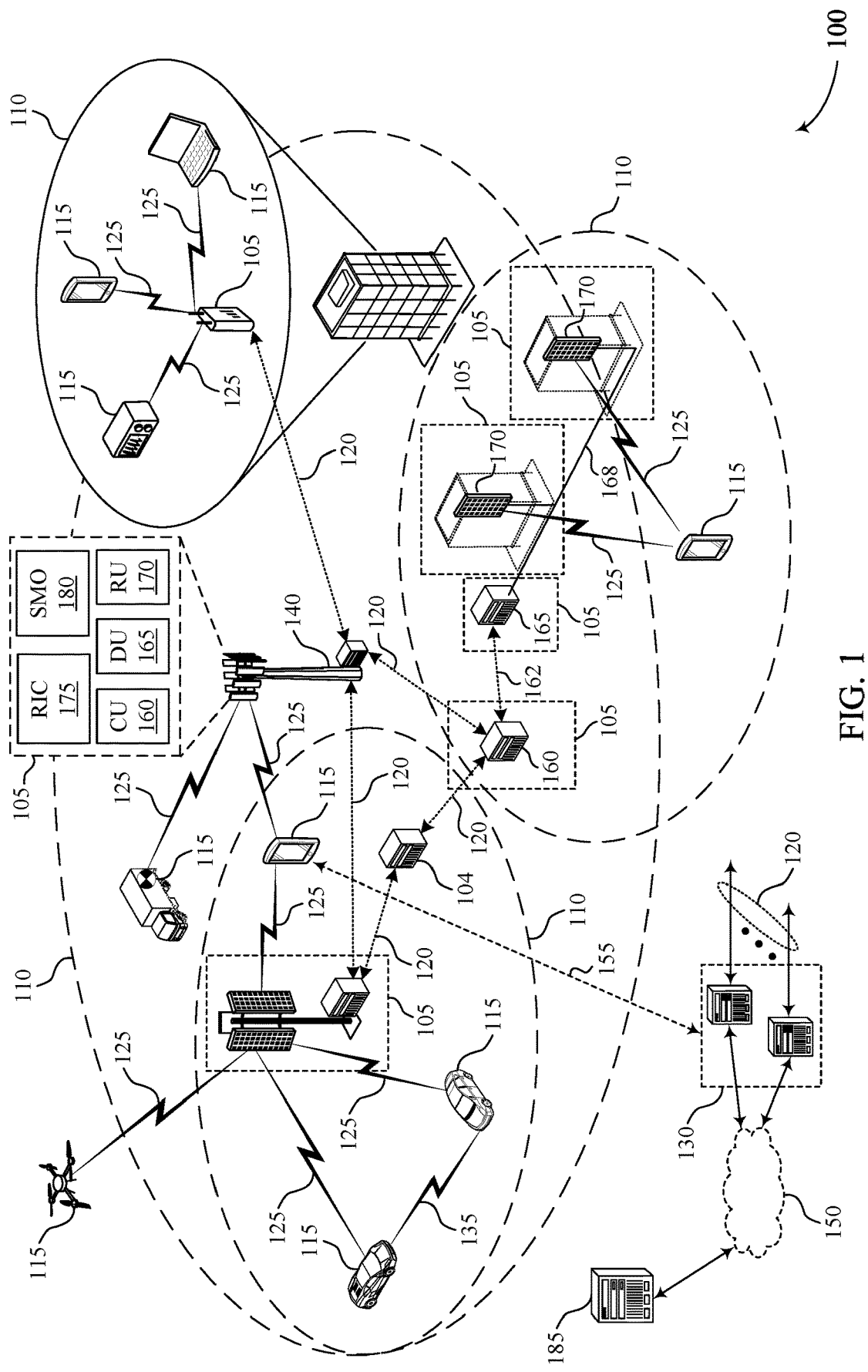
FIG. 1 illustrates an example of a wireless communications system that supports downlink congestion control optimization in accordance with one or more aspects of the present disclosure.

Some wireless communications systems may support packet-based communications. For example, a user plane entity of a radio access network (RAN) may be connected with an Internet Protocol (IP) service. The IP service may provide the RAN access to a packet-switched network, such as the Internet. The user plane entity may transfer data packets from one or more servers connected with the packet-switched network to wireless devices within the RAN, such as user equipments (UEs). The servers may be referred to as far-end or remote servers, and may represent examples of internet servers, databases, or other servers. A network connection between a UE and a server via a RAN and a packet-switched network may be established and maintained using transmission control protocol (TCP). The TCP may initiate a congestion control mechanism when an amount of congestion detected at the server is relatively high. The congestion control mechanism may calculate adjusted connection parameters to reduce data packet congestion. The adjusted connection parameters may correspond to, for example, a reduced rate or a quantity of data packet transmissions by the server. In some aspects, the UE, or other wireless devices in the RAN may be referred to as a data receiver for a transport protocol, and the server may be referred to as a data transmitter for transport protocol (e.g., or some other equivalent protocol, such as an application layer congestion protocol).

In some cases, however, the server may not effectively detect or accurately attribute congestion in the cellular connection between the UE and the server, such as over-the-air (OTA) congestion between a core network entity and the UE. For example, the TCP layer at the server may not account for variations in OTA communication parameters, such as OTA packet loss, OTA link rate, and OTA delay. Because the TCP layer at the server does not have a complete picture of the parameters affecting congestion in the OTA link between the RAN and the UE, the congestion control mechanism performed at the server may not be equipped to fully or adequately remediate the congestion in the connection between the server and the UE.

Techniques described herein provide for a UE to detect downlink packet congestion associated with packet reception at the UE from a server via a RAN. The UE may attempt to reduce or mitigate the detected packet congestion, which may reduce latency and improve throughput. To detect the packet congestion, the UE may measure one or more congestion metrics associated with packet reception at the UE. The congestion metrics may include RAN congestion metrics associated with packet transmission and reception via the RAN, transport layer or application layer congestion metrics associated with the network connection between the UE and the server, or both. For example, the RAN congestion metrics may include a link rate associated with OTA communications via the RAN, and the transport or application layer congestion metrics may include a packet loss, a TCP header type, an RTT, a BDP, or any combination thereof.

The UE may estimate an amount of packet congestion present in the RAN based on the measured parameters. For example, the UE may estimate congestion control parameters associated with a congestion control mechanism at the server based on the congestion metrics. The congestion control parameters may include a round-trip-time (RTT), a bandwidth delay product (BDP) (e.g., a product of link capacity and RTT), a congestion window size (e.g., a quantity of packets received in a single RTT), or any combination thereof. Additionally, or alternatively, the UE may estimate a state and a variant of the congestion control mechanism used by the server. In some aspects, the UE may utilize machine learning or statistical-based estimation techniques to estimate the amount of packet congestion, the congestion control parameters, and the congestion control state and variant.

The UE may predict (calculate or estimate) modified connection parameters that may reduce the packet congestion based on the estimated packet congestion. The UE may input the estimated packet congestion and congestion control parameters to a prediction algorithm to predict the modified connection parameters, where the prediction algorithm may represent an example of a machine learning-based algorithm, a statistical-based algorithm, or other type of prediction algorithm. The modified connection parameters may include a throttled acknowledgment rate, an adjusted receiver window size, one or more other connection parameters, or any combination thereof. For example, the UE may reduce a rate at which the UE transmits acknowledgments to the server, or the UE may combine acknowledgments or space out transmission of acknowledgments to the server. The server may transmit packets in response to the acknowledgments, such that the throttled acknowledgment rate may delay packet transmission by the server and reduce packet congestion. Additionally, or alternatively, the UE may indicate an adjusted receiver window size associated with a quantity of data packets the UE may receive within a given time period, and the server may adjust transmissions based on the receiver window size to reduce data packet congestion. Thus, a UE as described herein may predict adjusted uplink transmission parameters that will provide for the server to reduce or space out transmissions, thereby mitigating or reducing network congestion and improving throughput.

Aspects of the disclosure are initially described in the context of wireless communications systems. Additional aspects of the disclosure are described with reference to a connection parameter adjustment process, a machine learning process, packet-based communications timelines, and a process flow. Aspects of the disclosure are further illustrated by and described with reference to apparatus diagrams, system diagrams, and flowcharts that relate to downlink congestion control optimization.

FIG. 1 illustrates an example of a wireless communications system 100 that supports downlink congestion control optimization in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support downlink congestion control optimization as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, IP connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support packet-based communications. For example, the IP services 150 may provide the core network 130 with access to a packet-switched network, such as the Internet. As such, a wireless device, such as a UE 115, within the network may communicate with a server 185 (e.g., a remote server) connected to the packet-switched network. The UE 115 and the server 185 may exchange packets via the network connection. In some aspects, portions of the packets may be transmitted OTA via the RAN (e.g., from a network entity 105) and reassembled at the UE 115. The UE 115 may measure congestion metrics associated with receiving the packets at the UE 115 from the server 185 via the RAN. The congestion metrics may include one or more RAN congestion metrics associated with the RAN and one or more transport layer or application layer metrics associated with the network connection between the UE 115 and the server 185.

The UE 115 may estimate a packet congestion at the UE 115 based on the measured congestion metrics. In some aspects, the UE 115 may estimate one or more congestion control parameters associated with a congestion control mechanism used by the server 185. The UE 115 may modify one or more connection parameters of the network connection between the UE 115 and the server 185 based on the estimated packet congestion. The UE 115 may communicate with the server 185 over the network connection using the modified connection parameters. The modified connection parameters may reduce a quantity or rate of data packets transmitted at a time, which may reduce the packet congestion and improve throughput.

Figure 2:
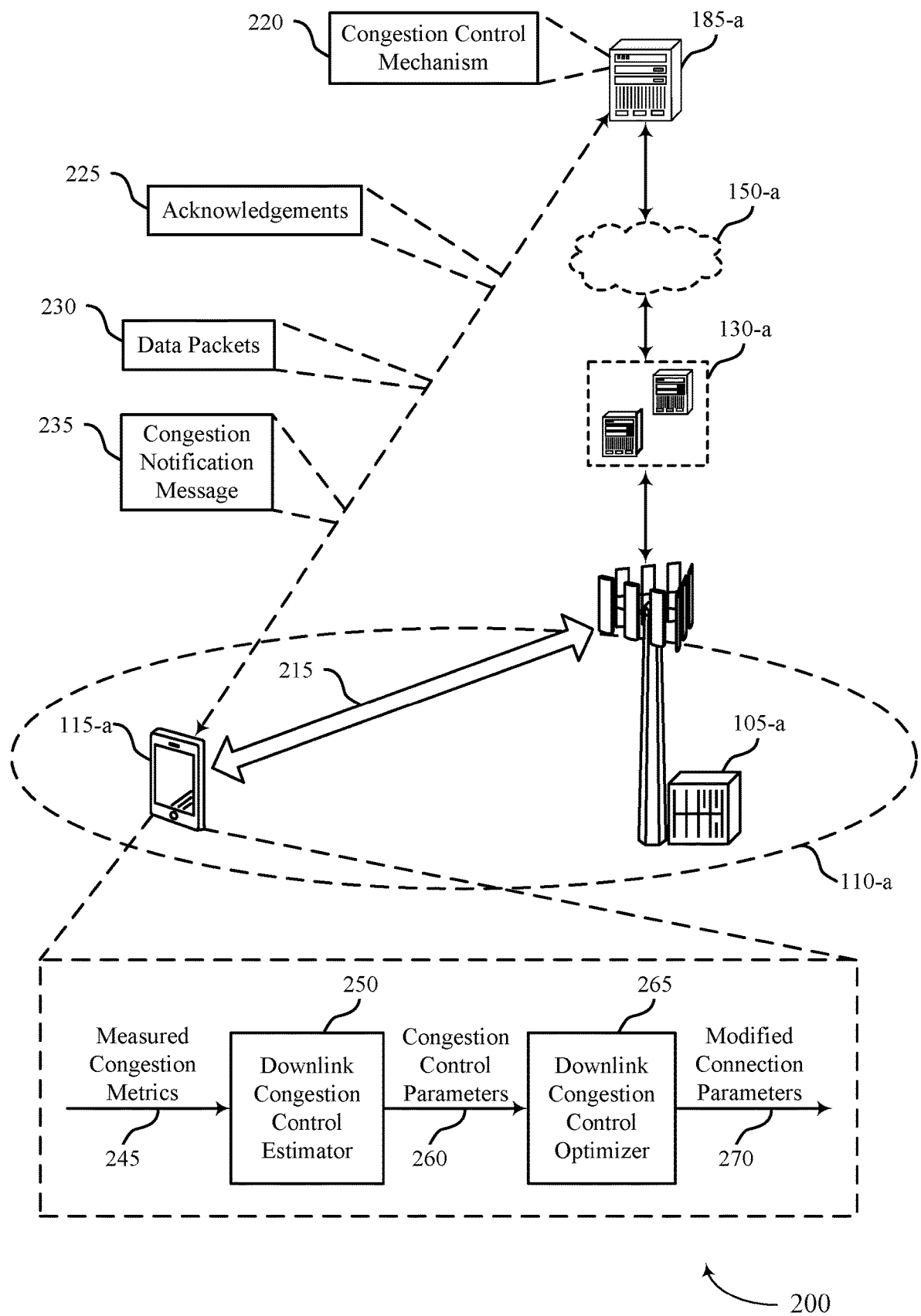
FIG. 2 illustrates an example of a wireless communications system that supports downlink congestion control optimization in accordance with one or more aspects of the present disclosure.

FIG. 2 illustrates an example of a wireless communications system 200 that supports downlink congestion control optimization in accordance with one or more aspects of the present disclosure. The wireless communications system 200 may represent an example of a wireless communications system 100 as described with reference to FIG. 1. For example, the wireless communications system 200 illustrates communications between a UE 115-*a* and a network entity 105-*a*, which may represent examples of corresponding devices as described with reference to FIG. 1. The network entity 105-*a* and the UE 115-*a* may communicate within a geographic coverage area 110-*a* and via a communication link 215. Additionally, the wireless communications system 200 illustrates communications between a core network 130-*a*, an IP service 150-*a*, and a server 185-*a*, which may represent examples of corresponding devices or nodes as described with reference to FIG. 1.

The wireless communications system 200 may support packet-based communications. For example, the core network 130-*a* may include a user plane entity, which may be connected with the IP services 150-*a* via one or more backhaul links. The IP services 150-*a* may include access to the Internet, Intranet(s), an IMS, or a Packet-Switched network, as described with reference to FIG. 1. The user plane entity may thus transfer data packets to and from the IP services 150-*a* via the RAN.

The IP services 150-*a* may be in communication with one or more servers, such as the server 185-*a*, via a packet-switched network, such as the Internet, or some other connection. The server 185-*a* may be referred to as a far-end or remote server 185-*a* and may represent an example of an internet server. As described herein, the UE 115-*a* and the server 185-*a* may exchange data packets 230 (e.g., IP packets, or some other types of packets). For example, the server 185-*a* may transmit data packets 230 through the packet-switched network to the IP services 150-*a*, and the IP services 150-*a* may forward the data packets 230 to the core network 130-*a* via a backhaul link. The core network 130-*a* may forward the data packets 230 through a backhaul link to the network entity 105-*a* (e.g., a CU, a DU, an RU, a base station 140), and the network entity 105-*a* may transmit the data packets 230 to the UE 115-*a* OTA via the communication link 215.

For clarity purposes, FIG. 2 illustrates a dashed line representing an example of a virtual connection between the UE 115-*a* and the server 185-*a*. In some aspects, the virtual connection may be referred to as a network connection. Although some communications are illustrated as being transferred directly between the UE 115-*a* and the server 185-*a* via the virtual connection in FIG. 2, it is to be understood that the communications may be relayed between the UE 115-*a* and the server 185-*a* via the network entity 105-*a*, the core network 130-*a*, and the IP services 150-*a*. Thus, the communications may be relayed via a combination of OTA connections and packet-switched network connections.

The network connection between the UE 115-*a* and the server 185-*a* may be established and maintained using TCP. TCP may be associated with a transport layer and may be used on top of IP to ensure reliable packet transmission (e.g., a TCP/IP protocol stack). For example, each data packet 230 transmitted using the TCP/IP may include an IP header and a TCP segment. The TCP segment may include a TCP header and data. The TCP header may include one or more fields configured to convey TCP information, such as a source identifier (ID), a destination ID, a sequence number, a window size indication, other TCP information, or any combination thereof. The server 185-*a*, the UE 115-*a*, or both may acknowledge a data packet 230 by transmitting a responsive acknowledgment 225. The acknowledgment 225 may be a data packet 230 with an acknowledgment bit in the TCP header set, or some other signal that verifies receipt (e.g., or failed receipt in the case of a negative acknowledgment) of a data packet 230. In some aspects, a UE 115 may represent an example of any wired or wireless device that supports packet-based communications and may be referred to as a data receiver for a transport protocol. The server 185-*a* may represent an example of any wired or wireless device or entity that supports packet-based communications and may be referred to as a data transmitter for transport protocol (e.g., or some other equivalent protocol, such as an application layer congestion protocol).

In some aspects, packet congestion may occur within the network when too many data packets 230 are in transit via the network at a given time. Packet congestion may result in decreased throughput and packet loss. For example, congestion in backhaul networks, packet-switched networks, or the Internet (e.g., in the backhaul links between the server 185-*a* and the IP services 150-*a*, the core network 130-*a*, or both) may result in packet loss. In some aspects, congestion may occur due to traffic policing, queue management, relatively shallow buffers within one or more network switches, or any combination thereof. Packet loss may additionally or alternatively occur due to OTA communications (e.g., via the communication link 215). For example, some data packets 230 or other signals may be degraded or lost when transmitted OTA.

The TCP may initiate a congestion control mechanism 220 at the server 185-*a* when an amount of congestion detected over the connection between the UE 115-*a* and the server 185-*a* is relatively high. The TCP may maintain a congestion window ($C_{WND}$) for the connection between the UE 115-*a* and the server 185-*a*, which may correspond to a maximum quantity of unacknowledged data packets 230 that may be in transmit via the virtual connection within a time period. The congestion control mechanism 220 may include or utilize an algorithm to adjust the congestion window or other parameters to reduce packet congestion. In some aspects, other network protocols that run in the transport layer or an application layer, such as a quick user datagram protocol (UDP) internet connection (QUIC) protocol, may initiate the congestion control mechanism 220 to reduce packet congestion.

In some cases, the server-side congestion control mechanism 220 may not effectively or accurately detect congestion in the cellular connection between the UE 115-*a* and the server 185-*a*, such as congestion between the network entity 105-*a* and the UE 115-*a* via the OTA communication link 215, congestion between the core network 130-*a* and the UE 115-*a*, or both. For example, the congestion control mechanism 220 at the server 185-*a* may be a loss-based mechanism and may not account for variations in OTA communication parameters, such as OTA packet loss, OTA link rate, and OTA delay. In such cases, the TCP may trigger the congestion control mechanism 220 after the network is already congested (e.g., by sensing packet loss or a relatively large RTT at the server 185-*a*). The congestion control algorithm may be susceptible to congestion in the network, which may provide for TCP back-off and TCP rate degradation. In some cases, the IP services 150-*a* (e.g., the Internet), the core network 130-*a* (e.g., the RAN), or both may not indicate congestion status (e.g., buffer depth) to the server 185-*a*, which may increase complexity and inaccuracy of predictions by the congestion control mechanism 220.

Techniques described herein provide for the UE 115-*a* to detect downlink packet congestion associated with packet reception at the UE 115-*a* from the server 185-*a* via the network. The UE 115-*a* may be further operable to calculate modified connection parameters 270 to reduce or mitigate the detected congestion. By utilizing congestion control algorithms at the UE 115-*a*, the UE 115-*a* may support reduced latency (e.g., low RTT) under variations in link rate, packet loss, and RTT metrics, which may improve throughput and communication reliability within the network.

To detect the packet congestion, the UE 115-*a* may measure one or more congestion metrics 245 associated with packet reception at the UE 115-*a*. The congestion metrics 245 may include RAN congestion metrics 245 associated with packet transmission and reception via the RAN, transport layer or application layer congestion metrics 245 associated with the network connection between the UE 115-*a* and the server 185-*a*, or both. For example, the RAN congestion metrics 245 may include a link rate associated with the transmission of data packets 230 OTA via the communication link 215 between the network entity 105-*a* and the UE 115-*a*, via a backhaul link between the core network 130-*a* and the network entity 105-*a*, or both. The transport or application layer congestion metrics may include a packet loss, a TCP header type, an RTT, a BDP, or any combination thereof. In some aspects, transport layer congestion metrics may be associated with the TCP and application layer congestion metrics may be associated with other network protocols that run in the application layer, such as a QUIC protocol.

The UE 115-*a* may estimate a type or an amount of packet congestion present at the UE 115-*a* based on the measured congestion metrics 245. For example, if the UE 115-*a* measures or detects a packet loss rate, the UE 115-*a* may estimate whether the packet loss rate is due to or corresponds to OTA communications or congestion. The UE 115-*a* may determine a type of the packet loss based on the measured congestion metrics 245, one or more PDCP statistics, or both. If the UE 115-*a* estimates that the packet loss rate is due to OTA communications via the RAN, the UE 115-*a* may or may not perform the described packet congestion mitigation techniques. The UE 115-*a* may refrain from performing packet congestion mitigation if the packet loss is caused by OTA communications, because such packet loss may be a known network condition. If the UE 115-*a* estimates that at least a portion of the packet loss rate is due to congestion (e.g., buffer overflow at the network entity 105-*a*), the UE 115-*a* may input the measured congestion metrics 245, including the measured packet loss rate, into a downlink congestion control estimator 250 to estimate and mitigate the packet congestion.

In some aspects, estimating the amount of packet congestion may include estimating congestion control parameters 260 associated with or utilized by the congestion control mechanism 220 at the server 185-*a*, which may be referred to as server-side congestion control parameters. For example, the UE 115-*a* may input the measured congestion metrics 245 to a downlink congestion control estimator 250 at the UE 115-*a* to generate (calculate, predict, or estimate) the congestion control parameters 260. The congestion control parameters 260 may include an RTT, a BDP (e.g., a product of link capacity and RTT), a congestion window size (e.g., a quantity of packets received in a single RTT), or any combination thereof used by the congestion control mechanism 220 at the server 185-*a*.

The UE 115-*a* may estimate a type (variant) or state of the congestion control mechanism 220 based on the congestion control parameters 260. In some aspects, the UE 115-*a* may utilize machine learning or statistical-based estimation techniques to reduce error associated with estimating the amount of packet congestion, the congestion control parameters 260, and the congestion control state and variant. The estimation of the congestion control parameters 260 and the congestion control type or state is described in further detail elsewhere herein, including with reference to FIGS. 3-6.

To improve packet congestion mitigation and communication throughput and reliability, the UE 115-*a* as described herein may further estimate modified connection parameters 270 to use for reducing or mitigating the detected packet congestion. For example, the UE 115-*a* may utilize a downlink congestion control optimizer 265 to calculate the modified connection parameters 270. Inputs to the downlink congestion control optimizer 265 may include the estimated congestion control parameters 260, the estimated type and state of the congestion control mechanism 220, or both. The downlink congestion control estimator 250, the downlink congestion control optimizer 265, or both may represent examples of circuitry, logic, or software implemented by the UE 115-*a* to perform the described packet congestion detection and mitigation techniques. In some aspects, the downlink congestion control estimator 250, the downlink congestion control optimizer 265, or both may utilize a prediction algorithm for estimating or calculating respective parameters. The prediction algorithm may represent an example of a machine learning-based algorithm, a statistical-based algorithm, or other type of prediction algorithm.

The downlink congestion control optimizer 265 may output the modified connection parameters 270, which may include a throttled acknowledgment rate, an adjusted receiver window size, one or more other connection parameters, or any combination thereof. For example, the UE 115-a may reduce a rate at which the UE 115-a transmits acknowledgments 225 to the server 185-a, or the UE 115-a may combine acknowledgments 225 (acknowledgment coalescing) or space out transmission of acknowledgments 225 (acknowledgment pacing) to the server 185-a. The server 185-a may transmit data packets 230 in response to the acknowledgments 225. As such, the throttled acknowledgment rate may delay transmission of the data packets 230 by the server 185-a, which may reduce packet congestion.

Additionally, or alternatively, the UE 115-a may indicate an adjusted receiver window size associated with a quantity of data packets 230 the UE 115-a may receive within a given time period, and the server 185-a may adjust a rate or quantity of data packets 230 to transmit based on the receiver window size, which may reduce data packet congestion. Modifying the connection parameters to space out packet transmissions between the UE 115-a and the server 185-a may reduce a likelihood of buffer overflow occurring at the network entity 105-a. For example, a quantity of data packets 230 in a buffer of the network entity 105-a at a given time may be reduced, which may provide for improved reliability of communications via the RAN.

In some aspects, the UE 115-a may receive a congestion notification message 235 from the network entity 105-a, or some other network node of the RAN. The congestion notification message 235 may represent an example of an early congestion notification (ECN)-type message that may indicate buffer overflow or potential buffer overflow at the network entity 105-a. For example, the network entity 105-a may transmit the congestion notification message 235 if a storage capacity of a network buffer is full above a threshold percentage (e.g., 80 percent full, 70 percent full, or some other adaptive threshold). The buffer may be a buffer of the network entity 105-a, or of one or more other switches or nodes in the network (e.g., a backhaul network buffer). In some aspects, the backhaul network may sense the potential buffer overflow, and the network entity 105-a may trigger a recommended bit query via the congestion notification message 235.

If the UE 115-a receives the congestion notification message 235, the UE 115-a may initiate the congestion control estimation and optimization procedures described herein. For example, the UE 115-a may utilize the downlink congestion control estimator 250, the downlink congestion control optimizer 265, or both to estimate modified connection parameters 270 that may reduce congestion and refrain from causing the buffer overflow.

Thus, a UE 115 as described herein may predict modified parameters for uplink communications that may provide for a server 185-a to reduce a quantity of data packet transmissions, a rate of data packet transmissions, or both. The UE 115 may thereby utilize UE-side measurements to predict and reduce or mitigate network congestion, which may improve throughput and reliability of communications.

Figure 3:
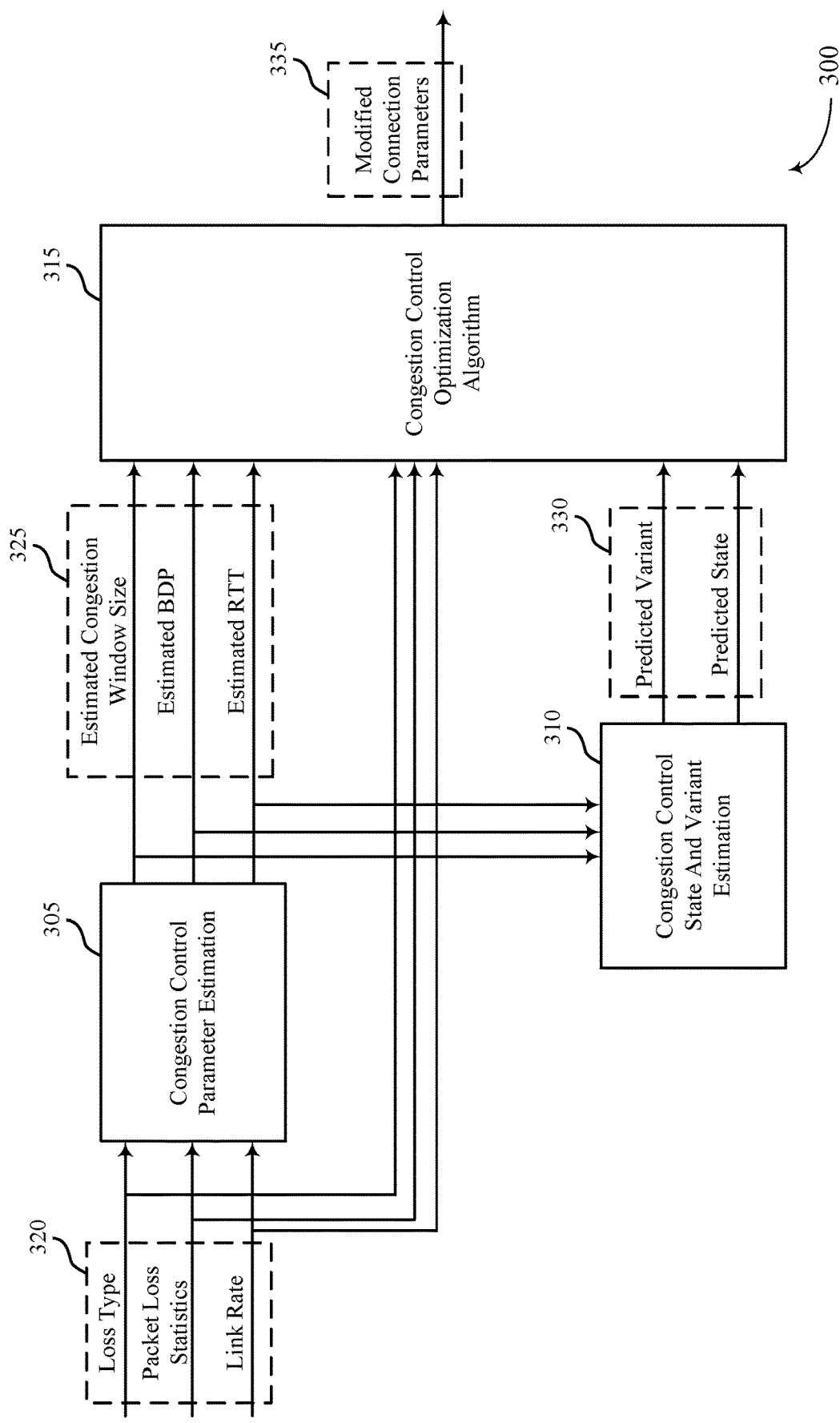
FIG. 3 illustrates an example of a connection parameter adjustment process that supports downlink congestion control optimization in accordance with one or more aspects of the present disclosure.

FIG. 3 illustrates an example of a connection parameter adjustment process 300 that supports downlink congestion control optimization in accordance with one or more aspects of the present disclosure. The connection parameter adjustment process 300 may implement or be implemented by aspects of the wireless communications systems 100 or 200, as described with reference to FIGS. 1 and 2. For example, the connection parameter adjustment process 300 illustrates an example procedure implemented by a UE to estimate congestion control parameters 325, congestion control mechanism parameters 330, and modified connection parameters 335 to use for communications with a server. The UE and the server may represent examples of corresponding devices as described with reference to FIGS. 1 and 2.

Techniques described herein provide for the UE to implement the connection parameter adjustment process 300 to estimate server side congestion control parameters 325 and calculate adjusted or modified connection parameters 335 to use for reducing packet congestion. The UE may initiate the connection parameter adjustment process 300 by measuring one or more congestion metrics 320. The congestion metrics 320 may represent examples of the congestion metrics 245 as described with reference to FIG. 2. For example, the UE may measure a packet loss type (e.g., backhaul or channel loss), packet loss statistics (e.g., a function of packet loss), an amount of packet loss, a link rate (e.g., a bottleneck link rate statistics and OTA link rate estimation), a value of a received TCP header, or any combination thereof. In some aspects, the UE may estimate whether a detected packet loss is due to OTA communications or packet congestion. If the UE estimates that at least a portion (e.g., a threshold quantity) of the packet loss is due to packet congestion, the UE may perform a congestion control parameter estimation 305 based on the measured congestion metrics 320.

The congestion control parameter estimation 305 may be implemented by logic, circuitry, software, or a combination thereof at the UE, and may be an example of the downlink congestion control estimator 250 as described with reference to FIG. 2. To perform the congestion control parameter estimation 305, the UE may utilize the measured congestion metrics 320 to estimate server side congestion control parameters 325 used by a server in communication with the UE.

The server side congestion control parameters 325 may represent examples of the congestion control parameters 260 described with reference to FIG. 2. For example, the server side congestion control parameters 325 may include an estimated congestion window size, and estimated BDP, an estimated RTT, other online or offline congestion parameters used by a congestion control mechanism at the server, or any combination thereof.

The RTT may indicate a time period or interval between a first time at which a data packet is sent by the server and a second time at which the data packet is acknowledged by the UE, or vice versa. The UE may estimate the RTT based on an auto-regressive analysis of data packets received from the server, based on one or more TCP time stamps, or both, as described in further detail elsewhere herein, including with reference to FIG. 5. The congestion window size may correspond to a quantity of data packets or bytes of data that may be transmitted within a single RTT. The UE may estimate the congestion window size based on the RTT, as described in further detail elsewhere herein, including with reference to FIG. 6. The BDP may correspond to a product of the RTT and a link capacity, which may be measured by the UE as part of the measured congestion metrics 320. For example, the estimated BDP may be indicative of a maximum amount of data that may be sent over a network connection between the UE and the server at a time (e.g., unacknowledged data that is in transit).

The congestion control parameter estimation 305 may thus output estimates of the RTT, the congestion window, the BDP, one or more other parameters used by a congestion control mechanism at the server, or any combination thereof. The congestion control parameter estimation 305 may be performed according to a machine learning-based model or a non-machine learning-based model. For example, the UE may perform a passive active-based measurement to calculate one or more of the congestion control parameters 325. Additionally, or alternatively, the UE may implement a neural network machine learning algorithm or some other prediction algorithm to reduce estimation errors associated with the estimation of the congestion control parameters 325. Example machine learning algorithms are described in further detail with reference to FIG. 4.

The UE may perform a congestion control state and variant estimation 310 based on the estimated congestion control parameters 325. The congestion control parameter estimation 305 may be implemented by logic, circuitry, or software, such as the downlink congestion control estimator 250 as described with reference to FIG. 2, or some other component of the UE. The congestion control state and variant estimation 310 may estimate one or more congestion control mechanism parameters 330, such as a state of the congestion control mechanism used by a server, a variant of the congestion control mechanism, one or more other parameters, or any combination thereof.

The predicted or estimated variant of the congestion control mechanism may correspond to a type of the congestion control mechanism implemented by the server. For example, the variant may be predicted by the UE from a set of known or configured variants used by different servers (e.g., a bottleneck bandwidth and RTT (BBR) algorithm, a CUBIC algorithm). The variant may indicate a general function or algorithm impended by the congestion control mechanism. Each variant may react differently to variations in packet loss, RTT, and BDP. The predicted or estimated state of the congestion control mechanism may correspond to a behavior of the congestion window based on the congestion control mechanism implemented by the server. For example, the predicted state of the congestion control mechanism may correspond to a slow start state, a congestion avoidance state, or some other state. The state may indicate an evolution of a congestion window size over time, and the state may vary based on a scenario in which the congestion control mechanism is being implemented.

The congestion control state and variant estimation 310 may be performed using statistical-based measurements, a machine learning model, or some other prediction algorithm. In some aspects, the congestion control state and variant estimation 310 may represent an example of a statistical-based optimization procedure. For example, the UE may detect the state and variant of the remote congestion control mechanism by detecting or estimating a sensitivity to variations in the estimated congestion control parameters 325, the measured congestion metrics 320, or both, such as RTT, BDP, or packet loss. In some aspects, each variant may correspond to a respective curve or shape of a curve that plots congestion window size versus a congestion control parameter 325, such as RTT. A state of the variant may correspond to a portion of the curve or a slope of the curve at a certain segment (e.g., a slow-start portion).

After estimating the congestion control parameters 325, the congestion control mechanism parameters 330, or both, the UE may implement a congestion control optimization algorithm 315 to calculate modified connection parameters 335. The congestion control optimization algorithm may be implemented by logic, circuitry, or software, such as the downlink congestion control optimizer 265 as described with reference to FIG. 2, or some other component of the UE. In some aspects, the congestion control optimization algorithm 315 may output the adjusted or modified values or configuration settings, or the congestion control optimization algorithm 315 may output a rule or policy for adjusting the connection parameters.

The congestion control optimization algorithm may represent an example of a machine learning algorithm, a statistical-based optimization algorithm, or some other type of algorithm for maximizing or increasing throughput by reducing packet congestion. In some aspects, the congestion control optimization algorithm may implement two or more different types of algorithms. Example machine learning algorithms are described with reference to FIG. 4.

If the congestion control optimization algorithm 315 is associated with statistical-based optimization, the congestion control optimization algorithm 315 may be modeled according to a nonlinear regression. The inputs to the nonlinear regression may include the estimated congestion control parameters 325, the measured congestion metrics 320, the estimated congestion control mechanism parameters 330, or any combination thereof. The nonlinear regression may output optimized configurations for the modified connection parameters 335.

The modified connection parameters 335 may include adjusted configurations or values of connection parameters that may be used by the UE for subsequent communications to improve or maximize throughput. The throughput may be improved by reducing packet congestion, which may be related to an amount of data transmitted by the remote server. Thus, the modified connection parameters 335 may be calculated to reduce transmissions by the server to improve capacity of one or more bottleneck buffers in the network and reduce buffer overflow. For example, the modified connection parameters 335 may include an adjusted receiver window sizing, a throttled acknowledgment rate, a policy for dynamic signaling to the remote server and the RAN, or any combination thereof.

The throttled acknowledgment rate may correspond to adaptive acknowledgment shaping, coalescing, pacing, or any combination thereof. For example, the modified connection parameters 335 may correspond to two or more acknowledgments that may be coalesced into a single data packet, or to an increased or decreased spacing between consecutive acknowledgments, or to an increased or decreased rate at which acknowledgments may be transmitted. The UE may transmit subsequent acknowledgments in accordance with the modified connection parameters 335, as described with reference to FIG. 2. By reducing a transmission rate of the acknowledgments, the UE may limit or reduce a maximum transmission unit (MTU) transmission speed at the sender (e.g., the server).

In some aspects, the UE may calculate a throttled acknowledgment rate, or other modified connection parameters, based on the estimated state and variant of the congestion control mechanism at the server. For example, if the UE estimates that the congestion control mechanism at the server is a loss-based mechanism (e.g., a CUBIC mechanism), the UE may trigger, calculate, or predict, a throttled acknowledgment rate to reduce congestion and improve network performance (e.g., increased throughput). If the UE estimates that the congestion control mechanism at the server is another type of congestion control mechanism, such as a BDP-based mechanism (e.g., BBR), the UE may refrain from triggering acknowledgment throttling to improve network performance.

The receiver window size may correspond to an amount of data (e.g., bytes) or data packets the UE can receive in a given time period. If the modified connection parameters 335 include an adjusted receiver window size, the UE may indicate the receiver window size to the server via an acknowledgment or other data packet (e.g., via a TCP header). The indication may include a time period and a quantity of data packets. The server may adjust communications based on the indicated receiver window size. Thus, if the modified connection parameters 335 indicate a reduced receiver window size, the UE may receive fewer data packets at a time, which may reduce congestion, reduce packet loss, and improve throughput.

The acknowledgment pacing rate and the receiver window size may or may not be linearly related to average throughput. Thus, the congestion control optimization algorithm 315 may dynamically calculate the modified connection parameters 335 to tune the acknowledgment rate, the receiver window size, or both, over time to reduce packet loss and improve network performance. A UE or other wireless device as described herein may thereby detect packet congestion and adjust modified connection parameters 335 accordingly to reduce the packet congestion and improve communication reliability and throughput.

Figure 4:
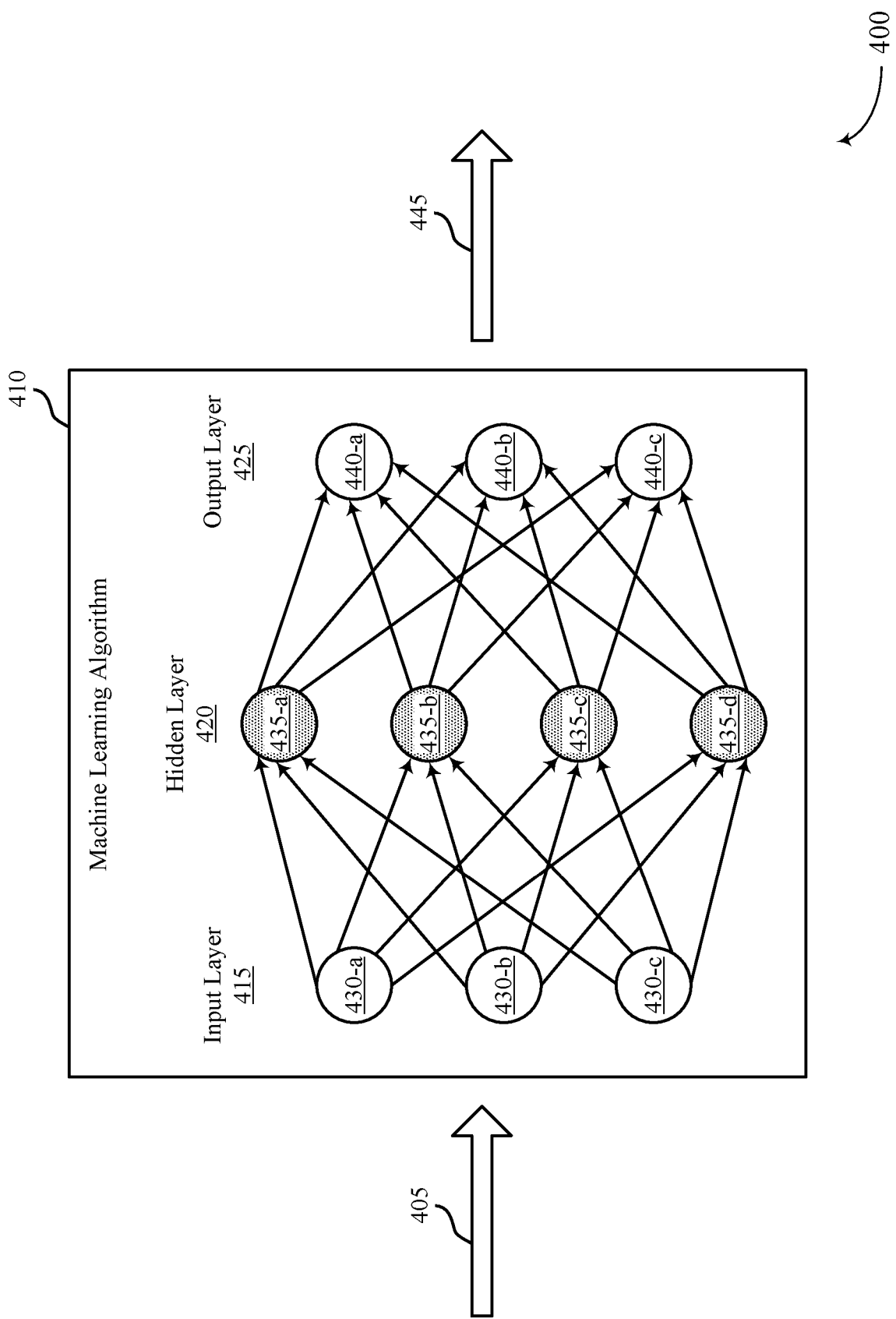
FIG. 4 illustrates an example of a machine learning process that supports downlink congestion control optimization in accordance with one or more aspects of the present disclosure.

FIG. 4 illustrates an example of a machine learning process 400 that supports downlink congestion control optimization in accordance with one or more aspects of the present disclosure. The machine learning process 400 may be implemented at a wireless device, such as a UE as described with reference to FIGS. 1-3. The machine learning process 400 may include a machine learning algorithm 410. In some examples, a UE may implement the machine learning algorithm 410 to improve early NACK predictions for the UE.

As described with reference to FIGS. 2 and 3, the machine learning process 400 may be implemented at a UE to enhance the estimation of packet congestion, server side parameters associated with congestion control, modified connection parameters, or any combination thereof. For example, the machine learning process 400 may be implemented at the UE to reduce errors associated with estimating packet congestion or congestion control parameters, to improve throughput over a network connection, or both. In some aspects, the machine learning process 400 may be implemented to enhance each of the congestion control parameter estimation 305, the congestion control state and variant estimation 310, and the congestion control optimization algorithm 315 illustrated in FIG. 3. Additionally, or alternatively, the machine learning process 400 may be implemented by the UE for a subset of one or more of the congestion estimation procedures, and other learning models (e.g., statistical-based learning) may be used for the other congestion estimation procedures.

In some aspects, the UE may send input values 405 to the machine learning algorithm 410 for processing. The input values 405 may be values associated with congestion metrics measured by the UE, estimated congestion control parameters, or both. The congestion metrics may represent examples of the congestion metrics 245 described with reference to FIG. 2 or the congestion metrics 320 described with reference to FIG. 3. For example, the congestion metrics and corresponding input values 405 may include one or more RAN congestion metrics associated with the RAN, one or more transport layer or application layer congestion metrics associated with a network connection between the UE and a server, or both. The input values 405 may be a link rate associated with OTA communications via a RAN, a packet loss (e.g., backhaul or channel loss), a TCP header, or a combination of these. Additionally, or alternatively, the input values 405 may correspond to estimated congestion control parameters, such as the estimated congestion control parameters 260, 325, 330, or any combination thereof, as described with reference to FIGS. 2 and 3. For example, the input values 405 may include an estimated RTT, an estimated BDP, an estimated congestion window size, an estimated congestion control variant, an estimated congestion control state, or any combination thereof. In some aspects, the congestion control parameters may be estimated by the UE using a first machine learning algorithm 410, and modified connection parameters may use the estimated congestion control parameters as input values 405 to a second machine learning algorithm 410.

The machine learning algorithm 410 may process the input values 405 and determine output values 445. In some aspects, the output values 445 may correspond to the estimated congestion control parameters, as discussed above. Additionally, or alternatively, the output values 445 may correspond to modified connection parameters for reducing downlink congestion. For example, an output value 445 may be a modified receiver window size, a modified or throttled acknowledgment rate (e.g., ACK coalescing, pacing, or shaping control), or any combination of these or other potential outputs.

In some examples, the machine learning algorithm 410 may be utilized to create a model for predicting an amount of packet congestion at the UE. For example, the machine learning algorithm 410 may determine whether packet congestion at the UE will exceed a threshold amount. The machine learning algorithm 410 may track congestion metrics measured by the UE, as well as other communication parameters. Based on such metrics, the machine learning algorithm 410 may predict whether an amount of packet congestion at the UE or in the network will exceed a threshold amount.

As illustrated, the machine learning algorithm 410 may be an example of a neural net, such as a feed forward (FF) or deep feed forward (DFF) neural network, a recurrent neural network (RNN), a long/short term memory (LSTM) neural network, or any other type of neural network. However, any other machine learning algorithms may be supported by the UE. For example, the machine learning algorithm 410 may implement a nearest neighbor algorithm, a linear regression algorithm, a Naïve Bayes algorithm, a random forest algorithm, or any other machine learning algorithm. Furthermore, the machine learning process 400 may involve supervised learning, unsupervised learning, semi-supervised learning, reinforcement learning, or any combination thereof. The machine learning may be performed prior to deployment of a UE, while the UE is deployed, during low usage periods of the UE while the UE is deployed, or any combination thereof.

The machine learning algorithm 410 may include an input layer 415, one or more hidden layers 420, and an output layer 425. In a fully connected neural network with one hidden layer 420, each hidden layer node 435 may receive a value from each input layer node 430 as input, where each input is weighted. These neural network weights may be based on a cost function that is revised during training of the machine learning algorithm 410. Similarly, each output layer node 440 may receive a value from each hidden layer node 435 as input, where the inputs are weighted. If post-deployment training (e.g., online training) is supported at a UE, the UE may allocate memory to store errors and/or gradients for reverse matrix multiplication. These errors and/or gradients may support updating the machine learning algorithm 410 based on output feedback. Training the machine learning algorithm 410 may support computation of the weights (e.g., connecting the input layer nodes 430 to the hidden layer nodes 435 and the hidden layer nodes 435 to the output layer nodes 440) to map an input pattern to a desired output outcome. This training may result in a UE-specific machine learning algorithm 410 based on the historic congestion control parameter estimations and/or modified connection parameter calculations by the UE.

The UE may send input values 405 to the machine learning algorithm 410 for processing. The input values 405 may be converted into a set of k input layer nodes 430 at the input layer 415. In some cases, different measurements may be input at different input layer nodes 430 of the input layer 415. Some input layer nodes 430 may be assigned default values (e.g., values of 0) if the number of input layer nodes 430 exceeds the number of inputs corresponding to the input values 405. As illustrated, the input layer 415 may include three input layer nodes 430-*a*, 430-*b*, and 430-*c*. However, it is to be understood that the input layer 415 may include any number of input layer nodes 430 (e.g., 20 input nodes).

The machine learning algorithm 410 may convert the input layer 415 to a hidden layer 420 based on a number of input-to-hidden weights between the k input layer nodes 430 and the n hidden layer nodes 435. The machine learning algorithm 410 may include any number of hidden layers 420 as intermediate steps between the input layer 415 and the output layer 425. Additionally, each hidden layer 420 may include any number of nodes. For example, as illustrated, the hidden layer 420 may include four hidden layer nodes 435-*a*, 435-*b*, 435-*c*, and 435-*d*. However, it is to be understood that the hidden layer 420 may include any number of hidden layer nodes 435 (e.g., 10 input nodes). In a fully connected neural network, each node in a layer may be based on each node in the previous layer. For example, the value of hidden layer node 435-*a* may be based on the values of input layer nodes 430-*a*, 430-*b*, and 430-*c* (e.g., with different weights applied to each node value).

The machine learning algorithm 410 may determine values for the output layer nodes 440 of the output layer 425 following one or more hidden layers 420. For example, the machine learning algorithm 410 may convert the hidden layer 420 to the output layer 425 based on a number of hidden-to-output weights between the n hidden layer nodes 435 and the m output layer nodes 440. In some cases, n=m. Each output layer node 440 may correspond to a different output value 445 of the machine learning algorithm 410. As illustrated, the machine learning algorithm 410 may include three output layer nodes 440-*a*, 440-*b*, and 440-*c*, supporting three different threshold values. However, it is to be understood that the output layer 425 may include any number of output layer nodes 440 (e.g., 2 output nodes, corresponding to either the decoding process will fail, or the decoding process will succeed). The values determined by the machine learning algorithm 410 for the output layer nodes 440 may correspond to probabilities or other metrics that the UE or the network entity may use to predict an amount of packet congestion, one or more congestion control parameters, modified connection parameters, or any combination thereof.

In some aspects, the machine learning algorithm 410 may be used or trained in various different operating scenarios using deep reinforcement learning. For example, an agent, such as a UE or network entity described herein, may use the machine learning algorithm 410 (e.g., a reinforced learning algorithm) to take an action and interact with an environment to maximize a reward. In this example, the action taken by the agent may correspond to adjusted connection parameters (e.g., acknowledgment coalescing, acknowledgment pacing, acknowledgment shaping, receiver window sizing, congestion parameters signaling). The environment may correspond to the RAN, the IP network, or both. The environment may react to the action, which the agent may perceive as an observation or an observed state. The observed state may be or correspond to, for example, changes in link rate, packet loss, or other congestion metrics. The agent may input the observed states to the machine learning algorithm 410 to further adjust the outputs 445 (e.g., actions). In some aspects, a reward in the described scenario may correspond to a reduction in congestion and a corresponding increase in throughput. The machine learning algorithm 410 may thus iteratively calculate adjusted outputs 445 (e.g., modified connection parameters) based on the reward and the observed states. The machine learning algorithm 410 may thereby be a reinforced learning-based machine learning process to improve downlink packet congestion.

Figure 5:
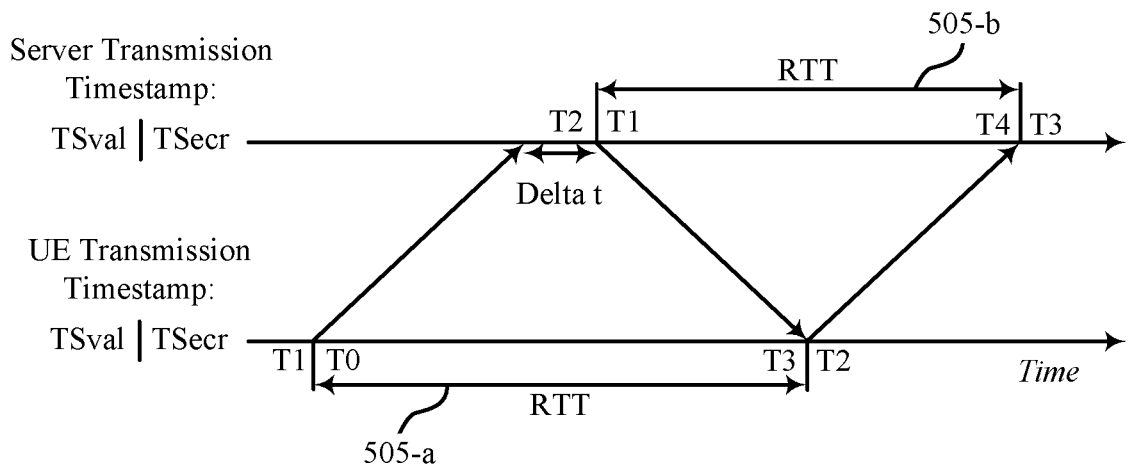
FIG. 5 illustrates an example of a packet-based communications timeline that supports downlink congestion control optimization in accordance with one or more aspects of the present disclosure.

FIG. 5 illustrates an example of a packet-based communications timeline 500 that supports downlink congestion control optimization in accordance with one or more aspects of the present disclosure. The packet-based communications timeline 500 may implement or be implemented by aspects of the wireless communications systems 100 and 200. For example, the packet-based communications timeline 500 illustrates packet transmissions between a server and a UE (e.g., a client), which may represent examples of a server 185 and a UE 115 as described with reference to FIGS. 1-4.

As described with reference to FIGS. 2-4 the UE may estimate one or more server-side congestion control parameters, which may include an estimated RTT 505. The RTT 505 may correspond to a time interval between a first time at which a data packet is transmitted and a second time at which the data packet is acknowledged.

In the example of FIG. 5, the UE may utilize one or more timestamps to estimate the RTT 505. A timestamp may correspond to a value or field (e.g., eight bits, or some other quantity of bits) in a TCP header that assists the devices in maintaining a current measurement of an RTT 505. Timestamps may provide for a TCP stack to set and adjust retransmission times. A TCP header in each data packet may include a first subset of bits (e.g., four bits) to convey a timestamp value (e.g., TSval) and a second subset of bits (e.g., four bits) to convey a timestamp echo reply (TSecr).

The timestamp value, TSval, may be derived by each end device as a random increasing value within the first subset of bits (e.g., a random 4-byte increasing value). Each end device may echo back the received timestamp value via the timestamp echo reply field, TSecr. A device, such as the UE, may receive a TCP data packet and calculate an RTT 505 based on a difference between a current timestamp value and the received timestamp echo reply value in the data packet.

In the example of FIG. 3, the UE may transmit a data packet (e.g., an acknowledgment) to the server at time T1. The timestamp value, TSval, in the TCP header of the data packet may indicate the time, T1, at which the data packet was transmitted (e.g., a first random 4-byte value, such as 470159915). If the UE previously received a data packet from the server with a timestamp value of T0, the timestamp echo reply, TSecr, in the TCP header of the data packet may echo the time T0 to the server.

The server may transmit a responsive data packet to the UE. In some aspects, there may be a delay for the server to receive the acknowledgment and prepare the responsive data packet (e.g., delta t). The server may transmit the responsive data packet to the UE at the time T2. The timestamp value in the TCP header of the responsive data packet may indicate the time, T2 (e.g., a second random increasing 4-byte value, such as 1125169296). The timestamp echo reply value in the TCP header of the responsive data packet may echo the timestamp value, T1, from the first data packet.

The UE may receive the responsive data packet at a third time, T3. The UE may calculate a first RTT 505-*a* at the UE side based on a difference between the current timestamp, T3, and the timestamp echo reply, T1, indicated via the TCP header. In one example, the timestamp T3 may be a third random increasing 4-byte value, such as 470160115, and the RTT 505-*a* may be 200 ms (e.g., T3−T1=200).

The UE may subsequently transmit an acknowledgment or other data packet with the timestamp value set to T3 and the timestamp echo reply value set T2. The server may receive the acknowledgment at T4. The server may calculate a second RTT 505-*b* at the server-side based on a difference between the current timestamp at the server, T4, and the timestamp echo reply indicated via the acknowledgment, T2. In one example, the timestamp T4 may be a fourth random increasing 4-byte value, such as 1125169508, and the RTT 505-*b* may be 212 ms (e.g., T4−T2=212). In some aspects, the UE and the server may calculate multiple RTTs 505 over time and may average the calculated RTTs 505.

In some aspects, the UE, the server, or both may calculate the RTT 505 based on an auto-regressive analysis of multiple received data packets. For example, the UE may forecast or predict an RTT 505 using a linear combination of previous values of the RTT 505 calculated by the UE (e.g., a regression of the RTT 505 against itself). Additionally, or alternatively, the UE, the server, or both may utilize a machine learning process to improve estimation of the RTT 505. The machine learning process may represent an example of a machine learning process 400 described with reference to FIG. 4.

The UE may thereby calculate or predict an RTT 505 associated with an acknowledgment and data pair. The UE may use the estimated RTT 505 for estimating a congestion control mechanism state, a congestion control mechanism variant, one or more adjusted connection parameters, or any combination thereof, as described with reference to FIGS. 2-4. Additionally, or alternatively, the UE may use the estimated RTT 505 to estimate or calculate a congestion window size, as described in further detail with reference to FIG. 6.

Figure 6:
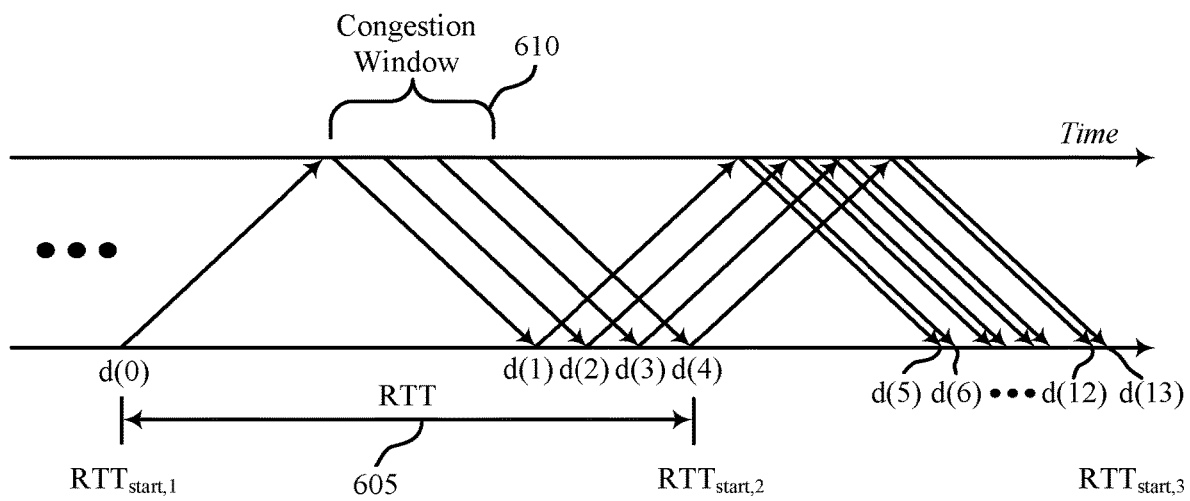
FIG. 6 illustrates an example of a packet-based communications timeline that supports downlink congestion control optimization in accordance with one or more aspects of the present disclosure.

FIG. 6 illustrates an example of a packet-based communications timeline 600 that supports downlink congestion control optimization in accordance with one or more aspects of the present disclosure. The packet-based communications timeline 600 may implement or be implemented by aspects of the wireless communications systems 100 and 200. For example, the packet-based communications timeline 600 illustrates packet transmissions between a server and a UE (e.g., a client), which may represent examples of a server 185 and a UE 115 as described with reference to FIGS. 1-5.

As described with reference to FIGS. 2-5 the UE may estimate one or more server-side congestion control parameters, which may include an estimated RTT 605, an estimated congestion window 610, or both. The RTT 605 may correspond to a time interval between a first time at which a data packet is transmitted and a second time at which the data packet is acknowledged. The RTT 605 may be calculated or predicted as described with reference to FIG. 5. The congestion window size 610 may correspond to a quantity of bytes or data packets that are in flight during an RTT 605.

A size of the congestion window 610 may be based on a round of an RTT 605. A starting boundary of an RTT round may be represented by $RTT_{start,n}$, where n may be the RTT round number starting from one. An ending boundary of an RTT round may be represented by $RTT_{end,n}$. There are two full RTT rounds illustrated in the example of FIG. 6 (e.g., $RTT_1$ and $RTT_2$). A data packet received during the congestion window may be represented by d(k), where k may represent a packet index. In the example of FIG. 6, 14 data packets may be received, with packet indices of zero to 13. The estimated congestion window 610 for an RTT round, n, may be represented by $cwind_{rtt(n)}$. In some aspects, there may be a one-to-one correspondence between an RTT round number and the congestion window 610.

If the UE identifies the starting and ending boundaries for an RTT round, n, the UE may measure a quantity of received data packets within the RTT boundaries. The quantity of received data packets may indicate the size of the congestion window 610 for the RTT round n. For example, the UE may initialize an RTT round and a packet counter. The starting boundary of an RTT round may be defined by a timestamp of a receiver sending a three-way handshake acknowledgment (e.g., data packet d(0) in FIG. 6 may start the first round of the RTT 605). The UE may set a current RTT start parameter to be the initialized RTT round (e.g., $RTT_{start, current}$=d(0)).

The UE may receive a subsequent data packet, d(k), and may identify a timestamp echo reply value (e.g., TSecr, as described with reference to FIG. 5) in the data packet d(k). If the value of the current RTT start parameter is the same as or later than the timestamp echo reply in the data packet d(k), the UE may increase a packet counter value by 1 (e.g., counter=counter+1). For example, at d(4), the packet counter value may be four as four data packets may be received since d(0). The UE may perform this increment for each data packet.

However, if, for a given packet d(k), the current RTT start parameter is before the timestamp echo reply value for the data packet, the UE may set an estimated congestion window 610 for the RTT round, n, to be the same as the current counter value. The UE may increase the RTT round number by one, reset the packet counter to one, and set the current RTT start parameter to the latest data packet received during the previous RTT round. For example, for the data packet d(5), the timestamp echo reply value may be d(1), which may be after the current RTT start parameter of d(0). As such, the UE may set the congestion window 610 for the first RTT round to four and may reset the current RTT start value to d(4). The UE may repeat the congestion window calculation for one or more subsequent RTT rounds until the TCP connection expires, or for a threshold quantity of RTT rounds.

In some aspects, the UE may estimate the congestion window size based on a quantity of received data packets having a maximum segment size (MSS) within an RTT round. The MSS may correspond to a largest amount of data, in bytes, that a device can receive in a single TCP segment. The MSS may be indicated via an options field of a TCP header.

Thus, the UE may calculate or estimate a size of a congestion window 610 based on the RTT 605 and active measurements. In some aspects, the UE may utilize a statistical-based method or an autoregressive method to calculate the congestion window size 610. Additionally, or alternatively, the UE, the server, or both may utilize a machine learning process and previous congestion windows 610 to improve estimation of the congestion window 610. The machine learning process may represent an example of a machine learning process 400 described with reference to FIG. 4.

The UE may use the estimated congestion window 610 for estimating a congestion control mechanism state, a congestion control mechanism variant, one or more adjusted connection parameters, or any combination thereof, which may provide for improved communication reliability and throughput, as described with reference to FIGS. 2-4.

Figure 7:
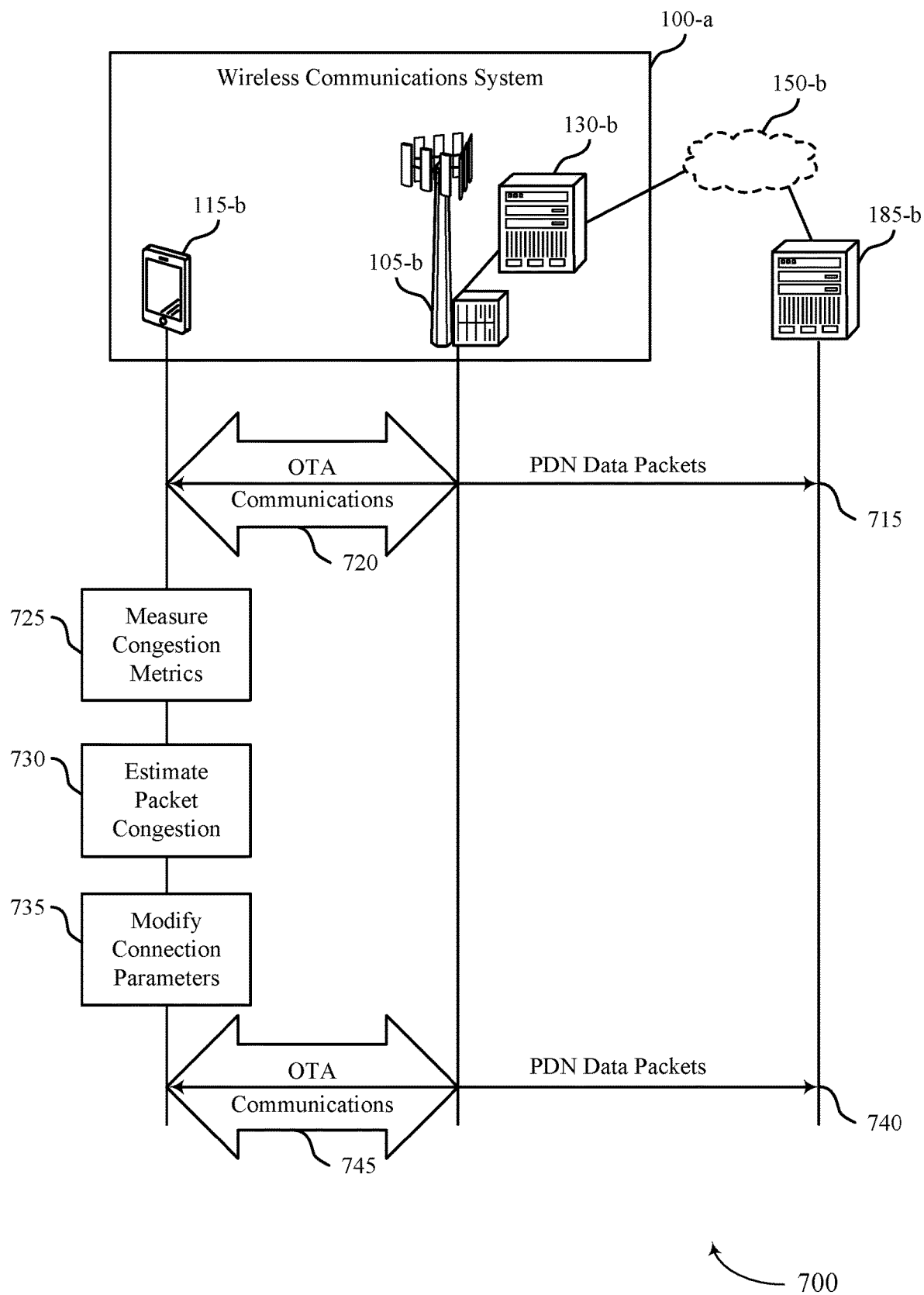
FIG. 7 illustrates an example of a process flow that supports downlink congestion control optimization in accordance with one or more aspects of the present disclosure.

FIG. 7 illustrates an example of a process flow 700 that supports downlink congestion control optimization in accordance with one or more aspects of the present disclosure. The process flow 700 may implement or be implemented by some aspects of the wireless communications systems 100 or 200. For example, the process flow 700 illustrates techniques for detecting and reducing packet congestion in a network connection between a UE 115-*b* and a server 185-*b*, where the UE 115-*b* and the server 185-*b* may represent examples of a UE 115 and a server 185 as described with reference to FIGS. 1-6. In some aspects, packets exchanged between the UE 115-*b* and the server 185-*b* may be relayed by or transferred via a core network 130-*b*, an IP service 150-*b*, or both, which may represent examples of corresponding components as described with reference to FIGS. 1-6.

The UE 115-*b* may be in communication with a network entity 105-*b* within a wireless communications system 100-*a*, as described with reference to FIGS. 1 and 2. The network entity 105-*b* may represent an example of a base station, an IAB node, an RU, a CU, a DU, or some other network node. The network entity 105-*b* may communicate with a core network 130-*b* via a wired or wireless backhaul link. The wireless communications system 100-*a* may, in some aspects, be referred to as a RAN.

The core network 130-*b* may include a user plane entity that may be connected with the IP services 150-*b*. The IP services 150-*b* may provide the user plane entity with access to a packet-switched network that may include the server 185-*b*. The user plane entity may transfer data packets to and from the core network 130-*b* and the server 185-*b*. The UE 115-*b* and the server 185-*b* may thereby exchange data packets via the IP services 150-*b* and the wireless communications system 100-*a*.

In the following description of the process flow 700, the operations between UE 115-*b*, the network entity 105-*b*, and the server 185-*b* may be performed in a different order than the order shown, or at different times. For example, certain operations may be left out of the process flow 700, or other operations may be added. Although some data packets are shown as being transferred directly between the UE 115-*b* and the server 185-*b*, it is to be understood that this is for clarity purposes, and the data packets may be relayed or switched OTA or via wired connections between one or more other networks, network entities, or components, as illustrated in FIGS. 2 and 7. Additionally, or alternatively, although the UE 115-*b*, the network entity 105-*b*, and the server 185-*b* are shown performing the operations of the process flow 700, some aspects of some operations may also be performed by one or more other wireless devices.

At 715, the server 185-*b* and the UE 115-*b* may exchange one or more data packets. In some aspects, the data packets may be transmitted by the server 185-*b*, the UE 115-*b*, or both in accordance with one or more transport layer or application layer metrics (e.g., a TCP or IP). At 720, the UE 115-*b* and the network entity 105-*b* may communicate OTA. For example, the UE 115-*b* and the network entity 105-*b* may exchange signals and messages via a wireless communication link within the wireless communications system 100-*a*, as described with reference to FIGS. 1 and 2. In some aspects, the OTA communications may include the data packets. For example, the network entity 105-*b* may relay the data packets to and from the core network 130-*b* via the wireless communications link. The data packets may be switched via a packet switched network between the core network 130-*b* and the server 185-*b*.

At 725, the UE 115-*b* may measure congestion metrics associated with receiving the data packets at the UE 115-*b* from the server 185-*b* via the RAN. The congestion metrics may include one or more RAN congestion metrics associated with the OTA communications within the wireless communications system 100-*a*, one or more transport layer or application layer congestion metrics associated with a network connection between the UE 115-*b* and the server 185-*b*, or both. The RAN congestion metrics may include a link rate or packet loss associated with the OTA communications via the RAN. The transport layer or application layer congestion metrics may include a packet loss, a TCP header, or both associated with congestion in the network connection between the UE 115-*b* and the server 185-*b*. In some aspects, the UE 115-*b* may measure a packet loss rate associated with the packets, and the UE 115-*b* may estimate whether the packet loss rate corresponds to OTA communications via the RAN, to the packet congestion, or both.

At 730, the UE 115-*b* may estimate packet congestion at the UE 115-*b* according to the measured congestion metrics. In some aspects, estimating the packet congestion may include estimating one or more server side parameters associated with congestion control, estimating a type of a congestion control mechanism at the server 185-*b*, estimating state of a congestion control mechanism at the server 185-*b*, or any combination thereof, as described with reference to FIGS. 2-6. The server side parameters associated with congestion control may include a congestion window size, an RTT, a BDP, or any combination thereof.

The UE 115-*b* may estimate the RTT by transmitting and receiving one or more data packets and performing an auto-regressive analysis or utilizing timestamps to calculate the RTT, as described with reference to FIG. 5. The UE 115-*b* may estimate or calculate the congestion window size based on the RTT and measurements performed by the UE 115-*b*, as described with reference to FIG. 6. In some aspects, the UE 115-*b* may utilize a machine learning algorithm, a statistical-based algorithm, or both to reduce an error associated with the estimations, as described with reference to FIG. 4.

At 735, the UE 115-*b* may modify one or more connection parameters of the network connection between the UE 115-*b* and the server 185-*b* based on the estimated packet congestion. For example, the UE 115-*b* may modify an acknowledgment rate, a receiver window size, or both. In some aspects, the UE 115-*b* may modify the connection parameters based on estimating that at least a portion of the packet loss rate corresponds to packet congestion.

At 740, the UE 115-*b* may communicate with the server 185-*b* over the network connection in accordance with the modified connection parameters. At 745, the UE 115-*b* may communicate with the network entity 105-*b* in accordance with the modified connection parameters. In some aspects, to communicate with the server 185-*b*, the UE 115-*b* may transmit data packets over the OTA uplink communication link to the network entity 105-*b*, and the network entity 105-*b* may forward the data packets to the server 185-*b*.

Communicating with the server 185-*b* according to the modified connection parameters may include throttling an acknowledgment rate for packets received over the network connection between the UE 115-*b* and the server 185-*b*. Additionally, or alternatively, communicating with the server 185-*b* according to the modified connection parameters may include transmitting an acknowledgment to the server 185-*b*, the acknowledgment including an indication of an adjusted receiver window size that corresponds to a quantity of data packets and a time period. In such cases, the UE 115-*b* may receive the quantity of data packets within the time period from the server 185-*b* over the network connection based on the indication of the adjusted receiver window size.

The UE 115-*b* may thereby detect packet congestion in the network and modify connection parameters accordingly. The modified connection parameters may provide for a reduction or reduced rate of packet transmission by the server 185-*b*, which may reduce the packet congestion, improve throughput, and improve communication reliability.

Figure 8:
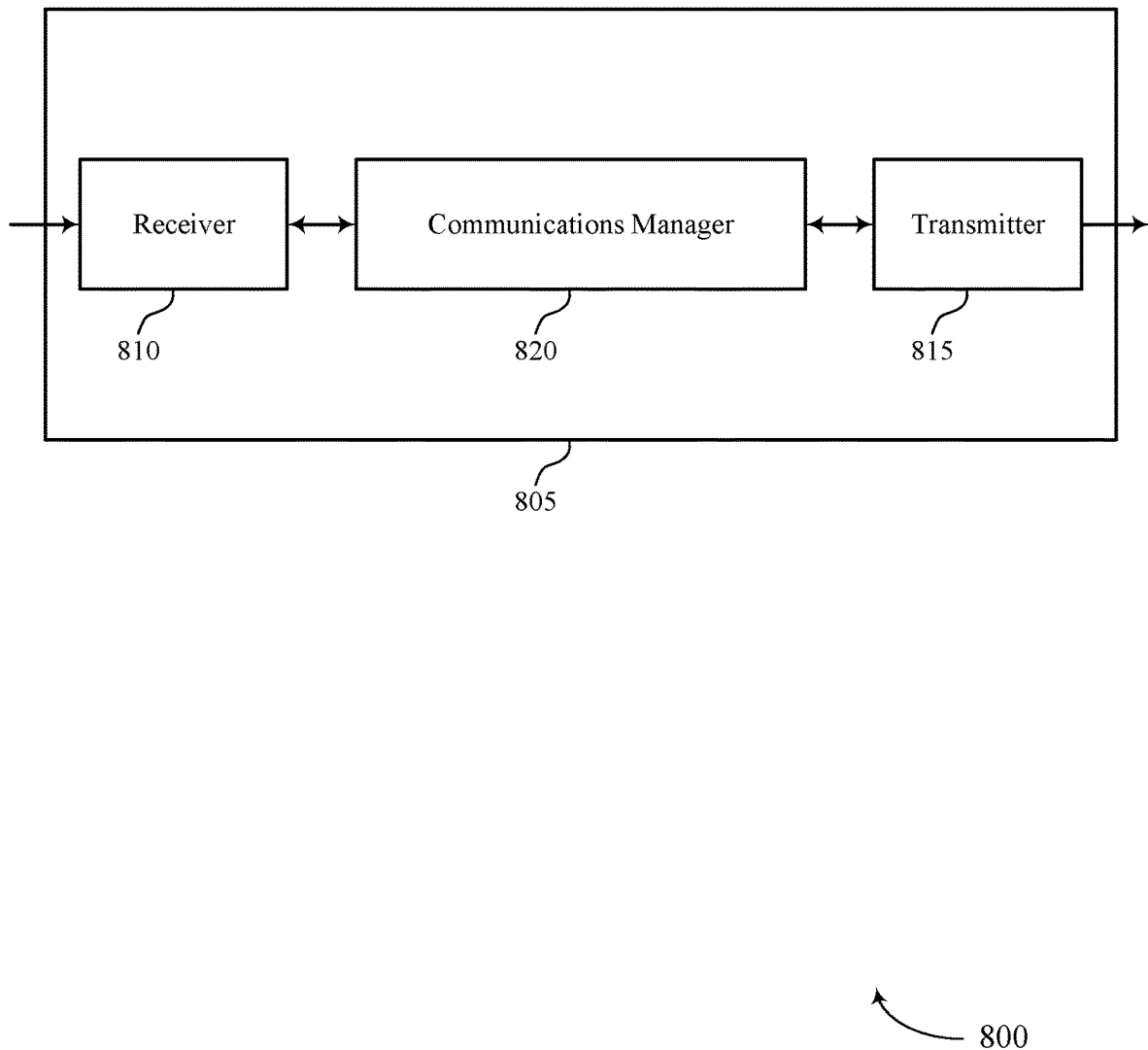
FIGS. 8 and 9 show block diagrams of devices that support downlink congestion control optimization in accordance with one or more aspects of the present disclosure.

FIG. 8 shows a block diagram 800 of a device 805 that supports downlink congestion control optimization in accordance with one or more aspects of the present disclosure. The device 805 may be an example of aspects of a UE 115 as described herein (e.g., a data receiver). The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to downlink congestion control optimization). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to downlink congestion control optimization). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of downlink congestion control optimization as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a data receiver in accordance with examples as disclosed herein. For example, the communications manager 820 may be configured as or otherwise support a means for measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The communications manager 820 may be configured as or otherwise support a means for estimating a packet congestion at the data receiver according to the measured set of multiple congestion metrics. The communications manager 820 may be configured as or otherwise support a means for modifying, based on the estimated packet congestion, one or more connection parameters of the network connection between the data receiver and the data transmitter. The communications manager 820 may be configured as or otherwise support a means for communicating with the data transmitter over the network connection in accordance with the modified connection parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, improved throughput, and more efficient utilization of communication resources. For example, by estimating packet congestion and modifying connection parameters, a processor of the device 805 (e.g., a UE or some other wireless device) may mitigate the congestion, which may improve throughput and communication reliability. The reduced packet congestion may provide for more efficient utilization of communication resources, reduced latency, and reduced processing associated with recovering lost data or receiving re-transmitted data packets.

Figure 9:
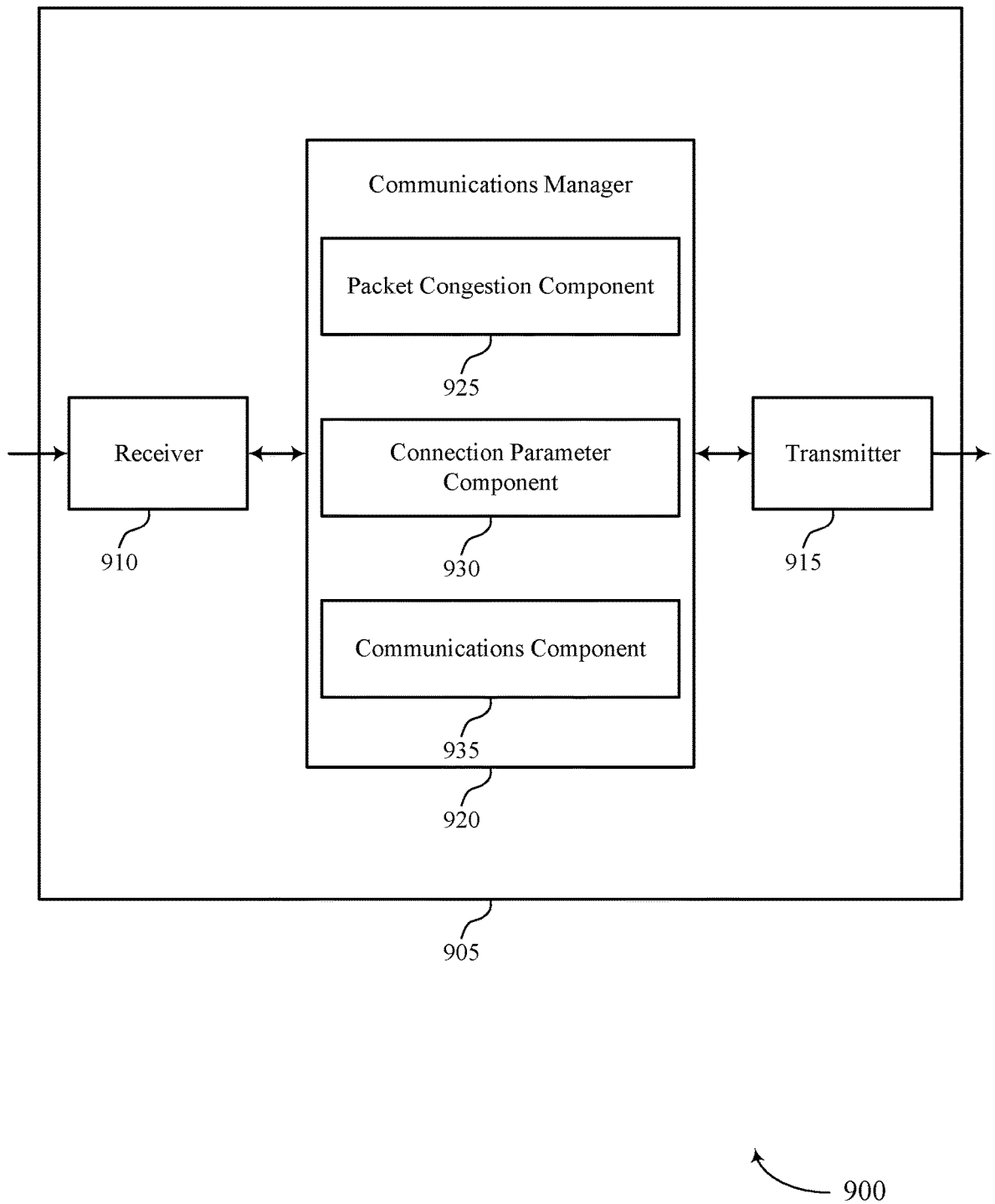

FIG. 9 shows a block diagram 900 of a device 905 that supports downlink congestion control optimization in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink congestion control optimization). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink congestion control optimization). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of downlink congestion control optimization as described herein. For example, the communications manager 920 may include a packet congestion component 925, a connection parameter component 930, a communications component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a data receiver in accordance with examples as disclosed herein. The packet congestion component 925 may be configured as or otherwise support a means for measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The packet congestion component 925 may be configured as or otherwise support a means for estimating a packet congestion at the data receiver according to the measured set of multiple congestion metrics. The connection parameter component 930 may be configured as or otherwise support a means for modifying, based on the estimated packet congestion, one or more connection parameters of the network connection between the data receiver and the data transmitter. The communications component 935 may be configured as or otherwise support a means for communicating with the data transmitter over the network connection in accordance with the modified connection parameters.

Figure 10:
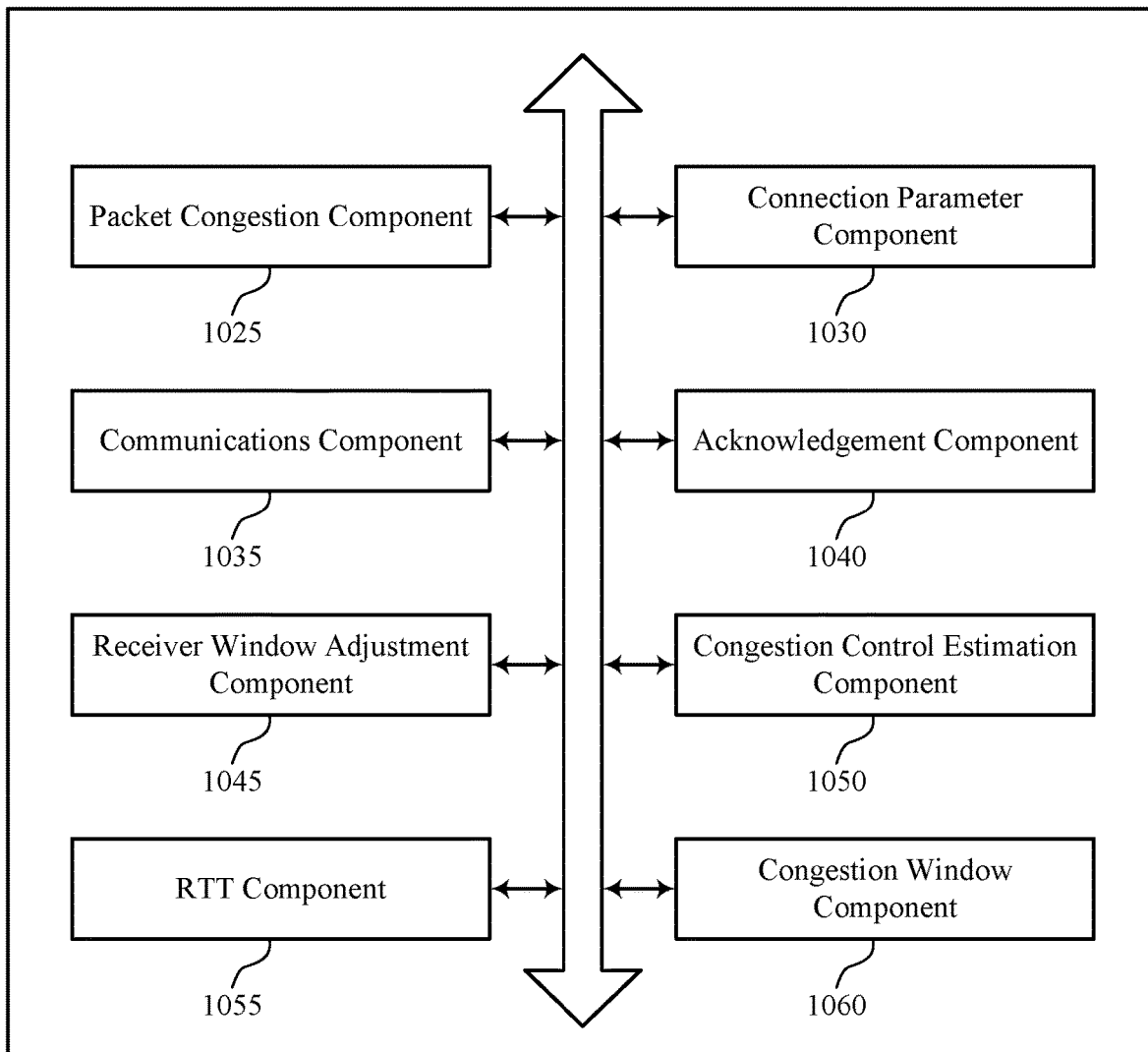
FIG. 10 shows a block diagram of a communications manager that supports downlink congestion control optimization in accordance with one or more aspects of the present disclosure.

FIG. 10 shows a block diagram 1000 of a communications manager 1020 that supports downlink congestion control optimization in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of downlink congestion control optimization as described herein. For example, the communications manager 1020 may include a packet congestion component 1025, a connection parameter component 1030, a communications component 1035, an acknowledgment component 1040, a receiver window adjustment component 1045, a congestion control estimation component 1050, an RTT component 1055, a congestion window component 1060, or any combination thereof. Each of these components may communicate, directly or indirectly, with one another (e.g., via one or more buses).

The communications manager 1020 may support wireless communication at a data receiver in accordance with examples as disclosed herein. The packet congestion component 1025 may be configured as or otherwise support a means for measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. In some examples, the packet congestion component 1025 may be configured as or otherwise support a means for estimating a packet congestion at the data receiver according to the measured set of multiple congestion metrics. The connection parameter component 1030 may be configured as or otherwise support a means for modifying, based on the estimated packet congestion, one or more connection parameters of the network connection between the data receiver and the data transmitter. The communications component 1035 may be configured as or otherwise support a means for communicating with the data transmitter over the network connection in accordance with the modified connection parameters.

In some examples, to support communicating with the data transmitter, the acknowledgment component 1040 may be configured as or otherwise support a means for throttling an acknowledgment rate for packets received over the network connection, where the modified connection parameters include the throttled acknowledgment rate.

In some examples, to support communicating with the data transmitter, the receiver window adjustment component 1045 may be configured as or otherwise support a means for transmitting an acknowledgment to the data transmitter including an indication of an adjusted receiver window size that corresponds to a quantity of data packets and a time period, where the modified connection parameters include the adjusted receiver window size. In some examples, to support communicating with the data transmitter, the receiver window adjustment component 1045 may be configured as or otherwise support a means for receiving, from the data transmitter over the network connection, the quantity of data packets within the time period based on the indication of the adjusted receiver window size.

In some examples, to support estimating the packet congestion at the data receiver, the congestion control estimation component 1050 may be configured as or otherwise support a means for estimating one or more data transmitter side parameters associated with congestion control, the one or more data transmitter side parameters including one or more of: a congestion window size, an RTT between the data receiver and the data transmitter, a BDP, or any combination thereof.

In some examples, to support estimating the packet congestion at the data receiver, the congestion control estimation component 1050 may be configured as or otherwise support a means for estimating a type of congestion control mechanism at the data transmitter, a state of the congestion control mechanism at the data transmitter, or both based on the estimated one or more data transmitter side parameters.

In some examples, the acknowledgment component 1040 may be configured as or otherwise support a means for throttling an acknowledgment rate for packets received over the network connection based on the type of the congestion control mechanism corresponding to a loss-based congestion control mechanism, where the modified connection parameters may include the throttled acknowledgment rate.

In some examples, to support estimating the RTT between the data receiver and the data transmitter, the RTT component 1055 may be configured as or otherwise support a means for transmitting, to the data transmitter, a first data packet at a first time, where a TCP header for the first data packet indicates the first time. In some examples, to support estimating the RTT between the data receiver and the data transmitter, the RTT component 1055 may be configured as or otherwise support a means for receiving, from the data transmitter, a second data packet at a second time in response to the first data packet, where a TCP header for the second data packet indicates the first time and the second time. In some examples, to support estimating the RTT between the data receiver and the data transmitter, the RTT component 1055 may be configured as or otherwise support a means for estimating the RTT based on a difference between the first time and the second time.

In some examples, to support estimating the RTT between the data receiver and the data transmitter, the RTT component 1055 may be configured as or otherwise support a means for estimating the RTT based on an auto-regressive analysis of a set of multiple data packets received from the data transmitter.

In some examples, to support estimating the congestion window size, the congestion window component 1060 may be configured as or otherwise support a means for receiving one or more data packets from the data transmitter during the RTT. In some examples, to support estimating the congestion window size, the congestion window component 1060 may be configured as or otherwise support a means for estimating the congestion window size based on a quantity of the one or more data packets received during the RTT.

In some examples, to support measuring the set of multiple congestion metrics, the packet congestion component 1025 may be configured as or otherwise support a means for measuring a packet loss rate associated with the data packets. In some examples, to support measuring the set of multiple congestion metrics, the packet congestion component 1025 may be configured as or otherwise support a means for estimating whether the packet loss rate corresponds to OTA communications via the RAN, to the packet congestion, or both. In some examples, modifying the one or more connection parameters of the network connection between the data receiver and the data transmitter may be based on estimating that at least a portion of the packet loss rate corresponds to the packet congestion.

In some examples, the packet congestion component 1025 may be configured as or otherwise support a means for receiving, from a network node of the RAN, a congestion notification message indicating a potential overflow of data packets in a buffer of the network node, where estimating the packet congestion at the data receiver may be based on the congestion notification message.

In some examples, to support estimating the packet congestion, the packet congestion component 1025 may be configured as or otherwise support a means for estimating the packet congestion based on a learning model corresponding to a neural network-based machine learning algorithm, a reinforced learning-based machine learning algorithm, a statistical-based algorithm, or any combination thereof, where an input to the learning model includes the set of multiple congestion metrics.

In some examples, to support modifying the one or more connection parameters, the connection parameter component 1030 may be configured as or otherwise support a means for calculating the one or more modified connection parameters based on a learning model corresponding to a neural network-based machine learning algorithm, a reinforced learning-based machine learning algorithm, a statistical-based algorithm, or any combination thereof, where an input to the learning model includes the estimated packet congestion.

In some examples, the one or more RAN congestion metrics associated with the RAN include a link rate associated with OTA communications via the RAN. In some examples, the one or more transport layer or application layer congestion metrics associated with the network connection between the data receiver and the data transmitter include a packet loss, an RTT, a BDP, a TCP header, or any combination thereof.

Figure 11:
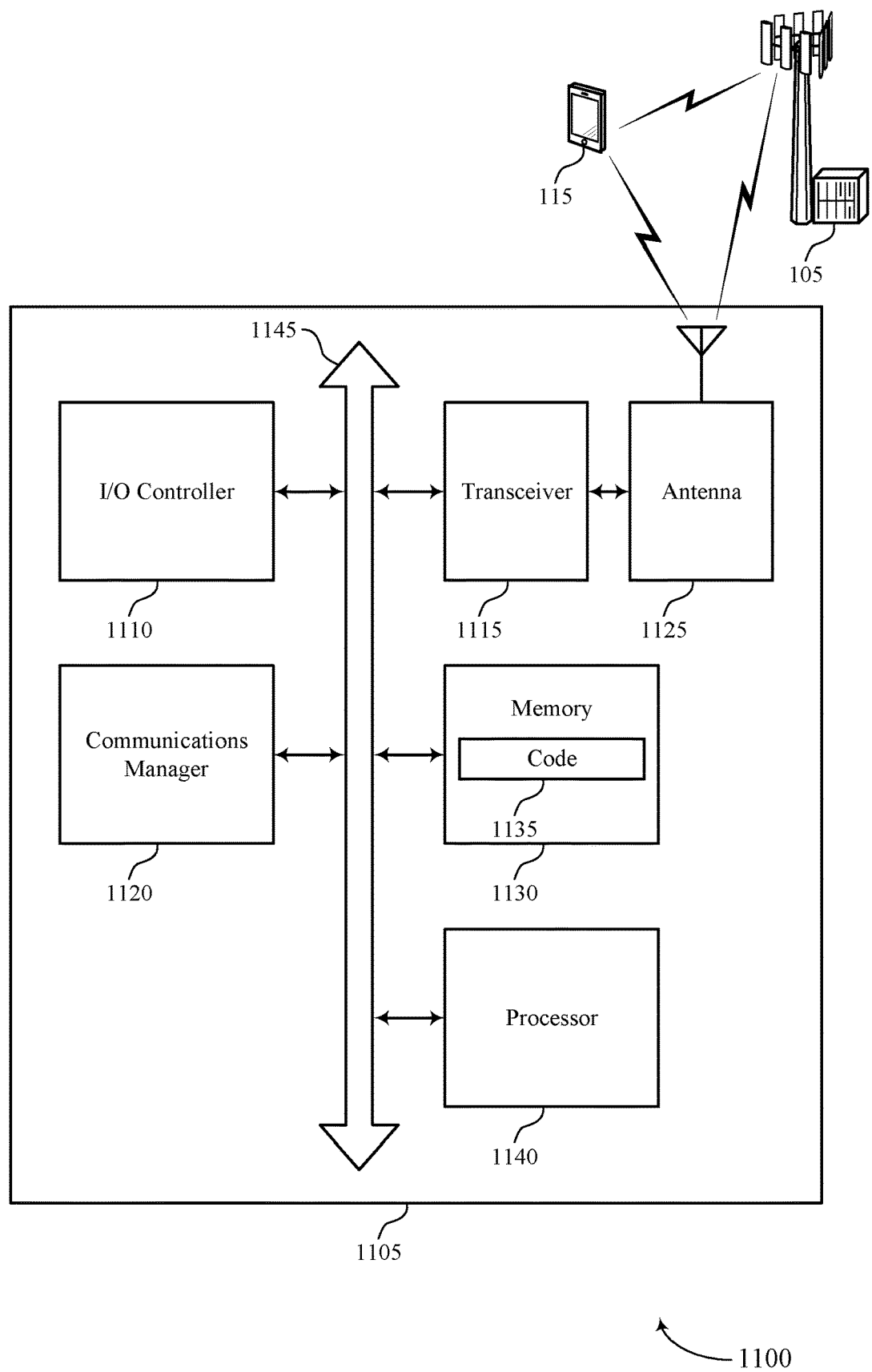
FIG. 11 shows a diagram of a system including a device that supports downlink congestion control optimization in accordance with one or more aspects of the present disclosure.

FIG. 11 shows a diagram of a system 1100 including a device 1105 that supports downlink congestion control optimization in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting downlink congestion control optimization). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a data receiver in accordance with examples as disclosed herein. For example, the communications manager 1120 may be configured as or otherwise support a means for measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The communications manager 1120 may be configured as or otherwise support a means for estimating a packet congestion at the data receiver according to the measured set of multiple congestion metrics. The communications manager 1120 may be configured as or otherwise support a means for modifying, based on the estimated packet congestion, one or more connection parameters of the network connection between the data receiver and the data transmitter. The communications manager 1120 may be configured as or otherwise support a means for communicating with the data transmitter over the network connection in accordance with the modified connection parameters.

By including or configuring the communications manager 1120 in accordance with examples as described herein, the device 1105 may support techniques for improved communication reliability, reduced latency, more efficient utilization of communication resources, improved coordination between devices, and improved throughput. By estimating packet congestion and modifying connection parameters accordingly, the device 1105 may mitigate packet congestion before the network becomes congested or buffer overflow occurs. The modified connection parameters may improve coordination between the device 1105 and a remote server. Additionally, or alternatively, the reduced packet congestion may provide for improved throughput and reliability of communications in the network.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of downlink congestion control optimization as described herein, or the processor 1140 and the memory 1130 may be otherwise configured to perform or support such operations.

Figure 12:
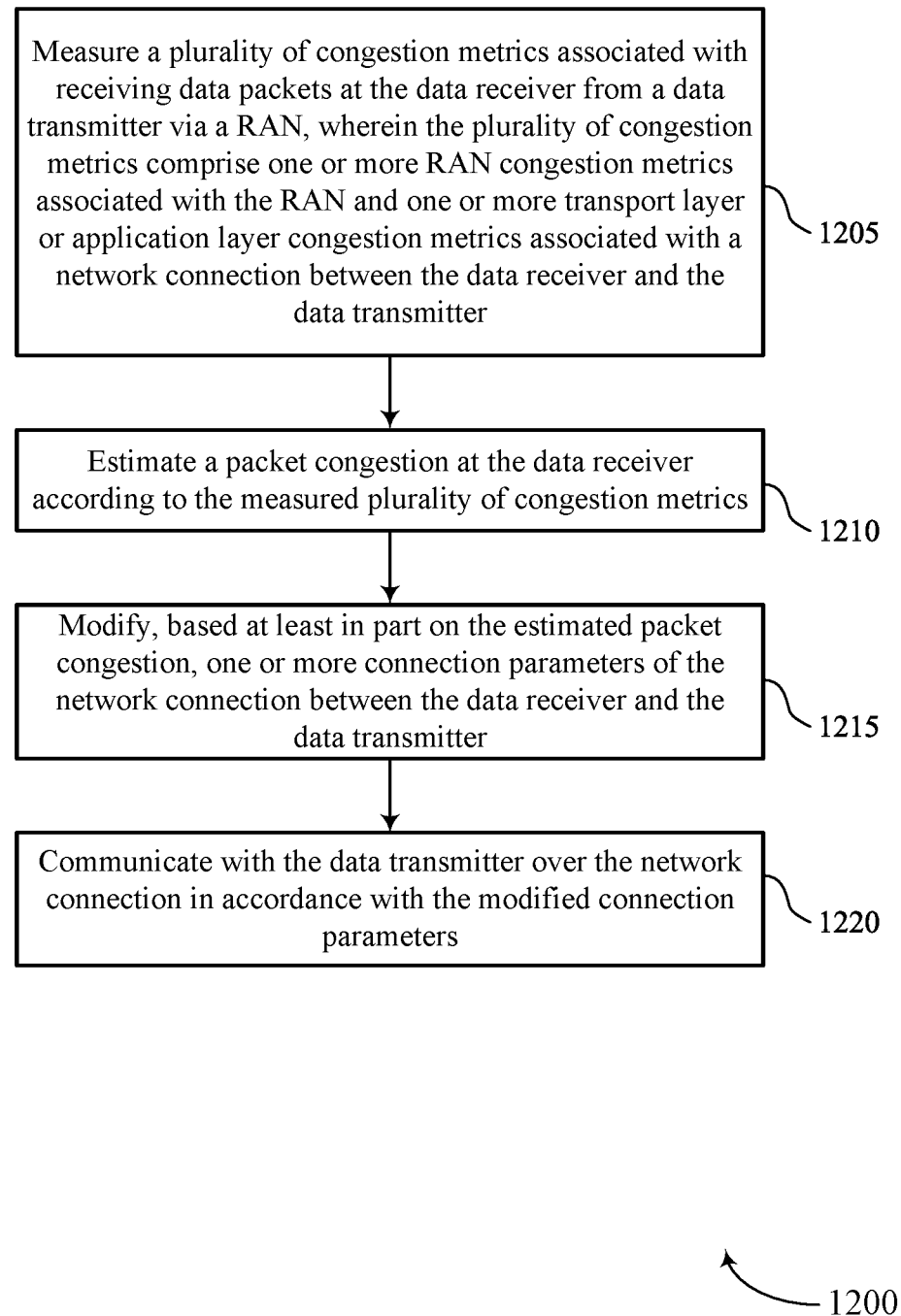
FIGS. 12 through 15 show flowcharts illustrating methods that support downlink congestion control optimization in accordance with one or more aspects of the present disclosure.

FIG. 12 shows a flowchart illustrating a method 1200 that supports downlink congestion control optimization in accordance with one or more aspects of the present disclosure. The operations of the method 1200 may be implemented by a data receiver (e.g., a UE) or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The operations of 1205 may be performed in accordance with examples as disclosed herein. In some examples, aspects of the operations of 1205 may be performed by a packet congestion component 1025 as described with reference to FIG. 10.

At 1210, the method may include estimating a packet congestion at the data receiver according to the measured set of multiple congestion metrics. The operations of 1210 may be performed in accordance with examples as disclosed herein. In some examples, aspects of the operations of 1210 may be performed by a packet congestion component 1025 as described with reference to FIG. 10.

At 1215, the method may include modifying, based on the estimated packet congestion, one or more connection parameters of the network connection between the data receiver and the data transmitter. The operations of 1215 may be performed in accordance with examples as disclosed herein. In some examples, aspects of the operations of 1215 may be performed by a connection parameter component 1030 as described with reference to FIG. 10.

At 1220, the method may include communicating with the data transmitter over the network connection in accordance with the modified connection parameters. The operations of 1220 may be performed in accordance with examples as disclosed herein. In some examples, aspects of the operations of 1220 may be performed by a communications component 1035 as described with reference to FIG. 10.

Figure 13:
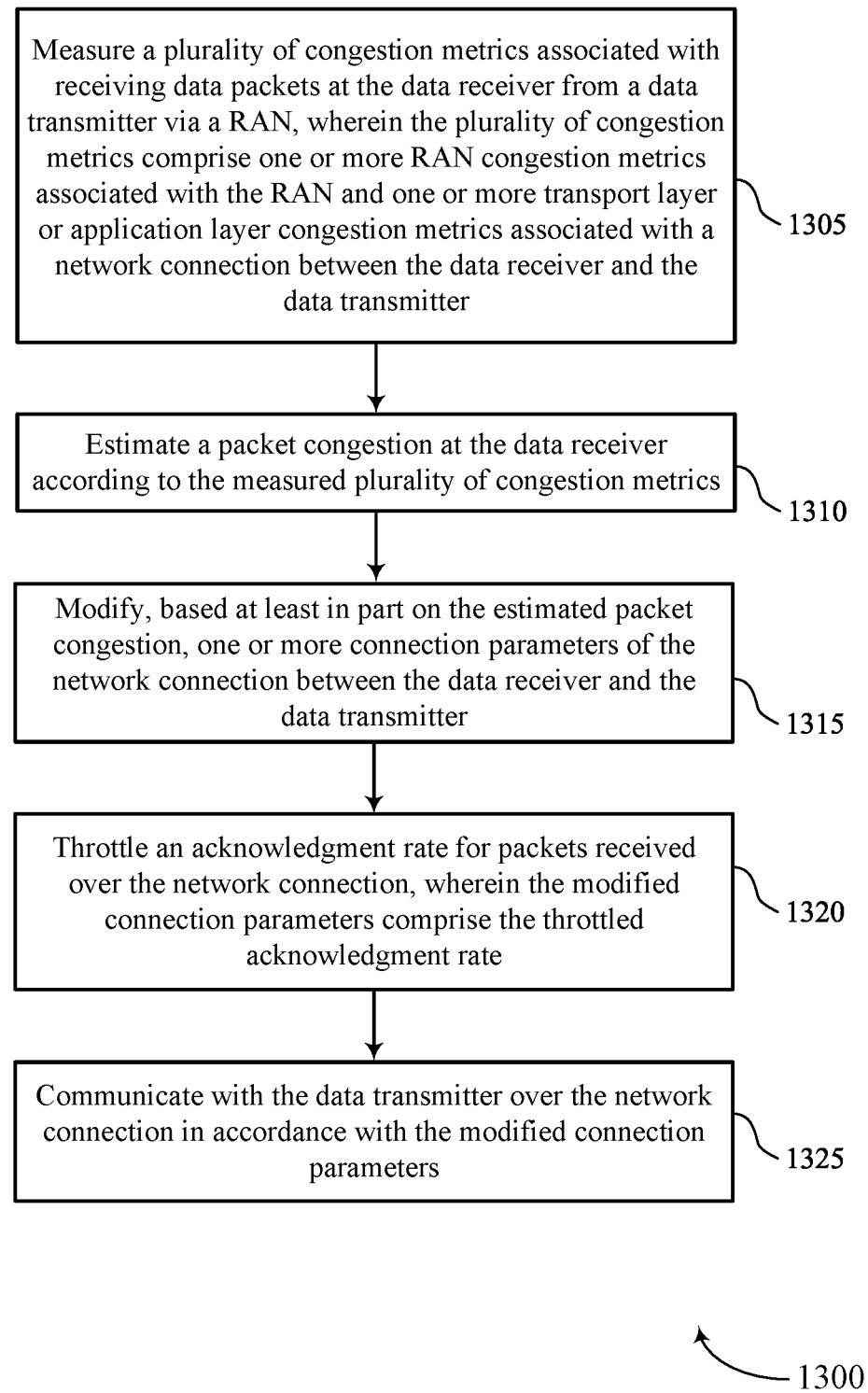

FIG. 13 shows a flowchart illustrating a method 1300 that supports downlink congestion control optimization in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The operations of 1305 may be performed in accordance with examples as disclosed herein. In some examples, aspects of the operations of 1305 may be performed by a packet congestion component 1025 as described with reference to FIG. 10.

At 1310, the method may include estimating a packet congestion at the data receiver according to the measured set of multiple congestion metrics. The operations of 1310 may be performed in accordance with examples as disclosed herein. In some examples, aspects of the operations of 1310 may be performed by a packet congestion component 1025 as described with reference to FIG. 10.

At 1315, the method may include modifying, based on the estimated packet congestion, one or more connection parameters of the network connection between the data receiver and the data transmitter. The operations of 1315 may be performed in accordance with examples as disclosed herein. In some examples, aspects of the operations of 1315 may be performed by a connection parameter component 1030 as described with reference to FIG. 10.

At 1320, the method may include throttling an acknowledgment rate for packets received over the network connection, where the modified connection parameters include the throttled acknowledgment rate. The operations of 1320 may be performed in accordance with examples as disclosed herein. In some examples, aspects of the operations of 1320 may be performed by an acknowledgment component 1040 as described with reference to FIG. 10.

At 1325, the method may include communicating with the data transmitter over the network connection in accordance with the modified connection parameters. The operations of 1325 may be performed in accordance with examples as disclosed herein. In some examples, aspects of the operations of 1325 may be performed by a communications component 1035 as described with reference to FIG. 10.

Figure 14:
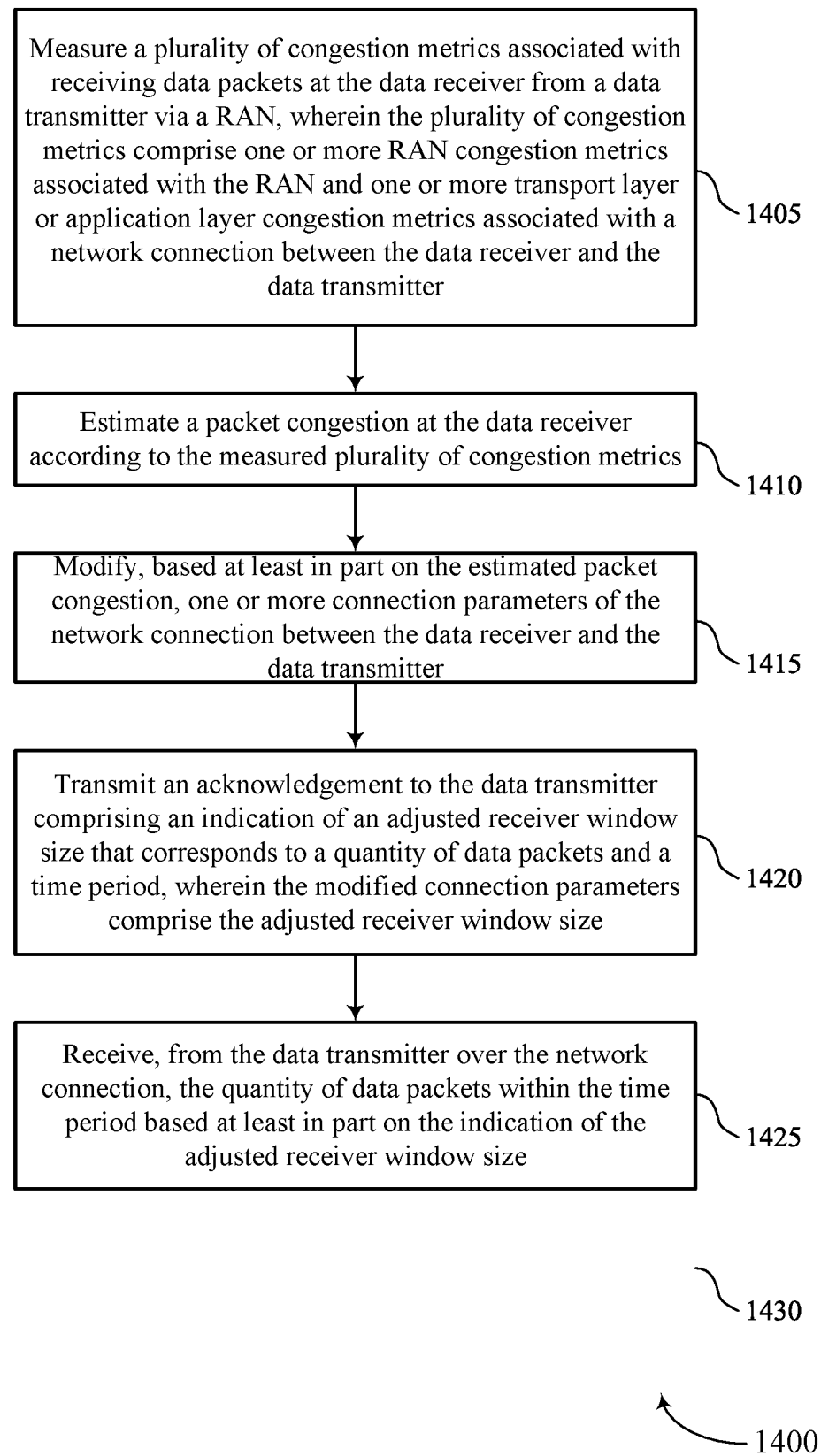

FIG. 14 shows a flowchart illustrating a method 1400 that supports downlink congestion control optimization in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The operations of 1405 may be performed in accordance with examples as disclosed herein. In some examples, aspects of the operations of 1405 may be performed by a packet congestion component 1025 as described with reference to FIG. 10.

At 1410, the method may include estimating a packet congestion at the data receiver according to the measured set of multiple congestion metrics. The operations of 1410 may be performed in accordance with examples as disclosed herein. In some examples, aspects of the operations of 1410 may be performed by a packet congestion component 1025 as described with reference to FIG. 10.

At 1415, the method may include modifying, based on the estimated packet congestion, one or more connection parameters of the network connection between the data receiver and the data transmitter. The operations of 1415 may be performed in accordance with examples as disclosed herein. In some examples, aspects of the operations of 1415 may be performed by a connection parameter component 1030 as described with reference to FIG. 10.

At 1420, the method may include transmitting an acknowledgment to the data transmitter including an indication of an adjusted receiver window size that corresponds to a quantity of data packets and a time period, where the modified connection parameters include the adjusted receiver window size. The operations of 1420 may be performed in accordance with examples as disclosed herein. In some examples, aspects of the operations of 1420 may be performed by a receiver window adjustment component 1045 as described with reference to FIG. 10.

At 1425, the method may include receiving, from the data transmitter over the network connection, the quantity of data packets within the time period based on the indication of the adjusted receiver window size. The operations of 1425 may be performed in accordance with examples as disclosed herein. In some examples, aspects of the operations of 1425 may be performed by a receiver window adjustment component 1045 as described with reference to FIG. 10.

Figure 15:
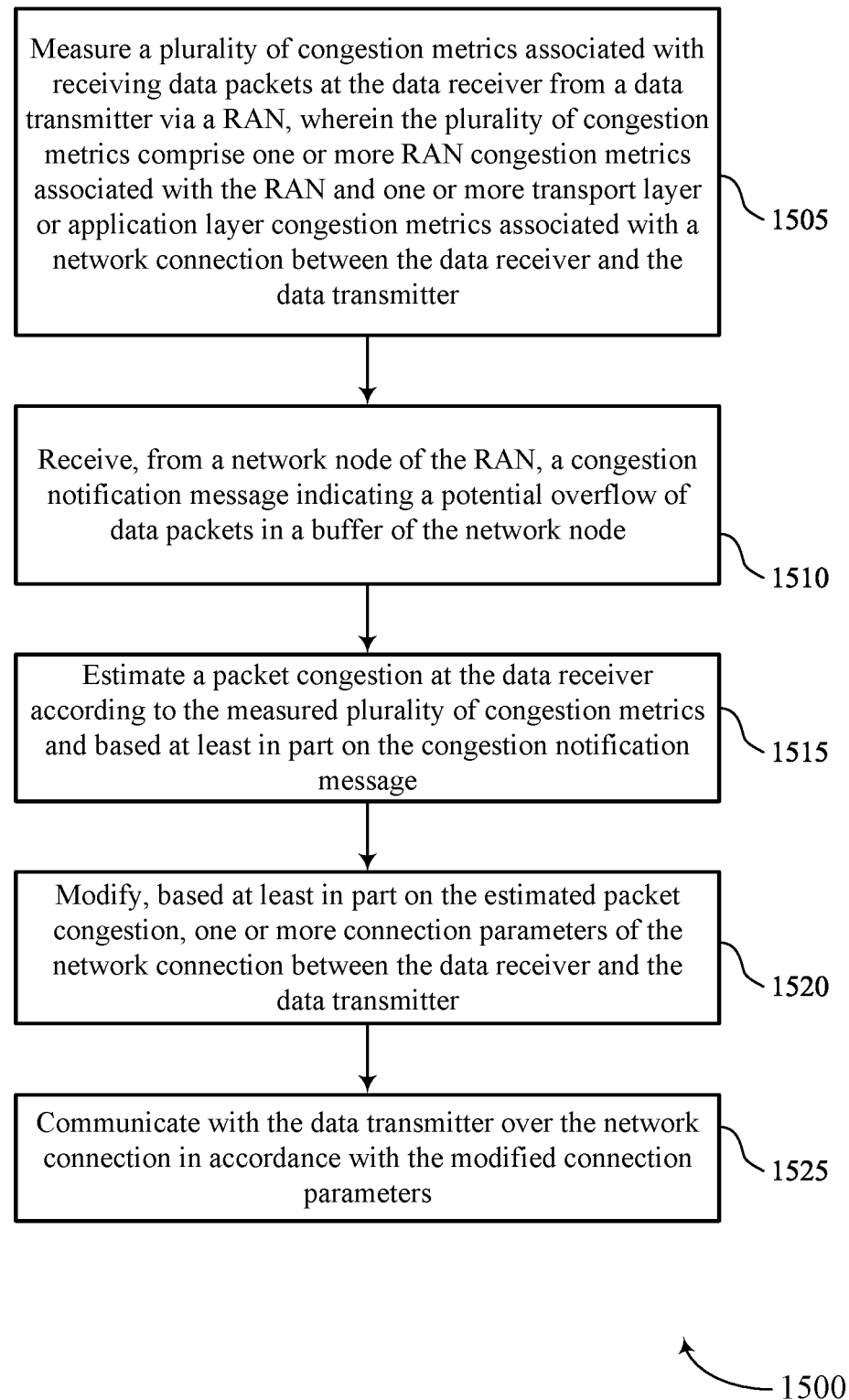

FIG. 15 shows a flowchart illustrating a method 1500 that supports downlink congestion control optimization in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include measuring a set of multiple congestion metrics associated with receiving data packets at the data receiver from a data transmitter via a RAN, where the set of multiple congestion metrics include one or more RAN congestion metrics associated with the RAN and one or more transport layer or application layer congestion metrics associated with a network connection between the data receiver and the data transmitter. The operations of 1505 may be performed in accordance with examples as disclosed herein. In some examples, aspects of the operations of 1505 may be performed by a packet congestion component 1025 as described with reference to FIG. 10.

At 1510, the method may include receiving, from a network node of the RAN, a congestion notification message indicating a potential overflow of data packets in a buffer of the network node. The operations of 1510 may be performed in accordance with examples as disclosed herein. In some examples, aspects of the operations of 1510 may be performed by a packet congestion component 1025 as described with reference to FIG. 10.

At 1515, the method may include estimating a packet congestion at the data receiver according to the measured set of multiple congestion metrics and based on the congestion notification message. The operations of 1515 may be performed in accordance with examples as disclosed herein. In some examples, aspects of the operations of 1515 may be performed by a packet congestion component 1025 as described with reference to FIG. 10.

At 1520, the method may include modifying, based on the estimated packet congestion, one or more connection parameters of the network connection between the data receiver and the data transmitter. The operations of 1520 may be performed in accordance with examples as disclosed herein. In some examples, aspects of the operations of 1520 may be performed by a connection parameter component 1030 as described with reference to FIG. 10.

At 1525, the method may include communicating with the data transmitter over the network connection in accordance with the modified connection parameters. The operations of 1525 may be performed in accordance with examples as disclosed herein. In some examples, aspects of the operations of 1525 may be performed by a communications component 1035 as described with reference to FIG. 10.

The following provides an overview of aspects of the present disclosure:

Aspect 1: A method for wireless communication at a data receiver, comprising: measuring a plurality of congestion metrics associated with receiving data packets at the data receiver from a data transmitter via a RAN, wherein the plurality of congestion metrics comprise one or more RAN congestion metrics associated with the RAN and one or more transport layer or application layer congestion metrics associated with a network connection between the data receiver and the data transmitter; estimating a packet congestion at the data receiver according to the measured plurality of congestion metrics; modifying, based at least in part on the estimated packet congestion, one or more connection parameters of the network connection between the data receiver and the data transmitter; and communicating with the data transmitter over the network connection in accordance with the modified connection parameters.

Aspect 2: The method of aspect 1, wherein communicating with the data transmitter comprises: throttling an acknowledgment rate for packets received over the network connection, wherein the modified connection parameters comprise the throttled acknowledgment rate.

Aspect 3: The method of any of aspects 1 through 2, wherein communicating with the data transmitter comprises: transmitting an acknowledgment to the data transmitter comprising an indication of an adjusted receiver window size that corresponds to a quantity of data packets and a time period, wherein the modified connection parameters comprise the adjusted receiver window size.

Aspect 4: The method of aspect 3, further comprising: receiving, from the data transmitter over the network connection, the quantity of data packets within the time period based at least in part on the indication of the adjusted receiver window size.

Aspect 5: The method of any of aspects 1 through 3, wherein estimating the packet congestion at the data receiver comprises: estimating one or more data transmitter side parameters associated with congestion control, the one or more data transmitter side parameters comprising one or more of: a congestion window size, an RTT between the data receiver and the data transmitter, a BDP, or any combination thereof.

Aspect 6: The method of aspect 5, wherein estimating the packet congestion at the data receiver comprises: estimating a type of congestion control mechanism at the data transmitter, a state of the congestion control mechanism at the data transmitter, or both based at least in part on the estimated one or more data transmitter side parameters.

Aspect 7: The method of any of aspects 5 through 6, wherein estimating the RTT between the data receiver and the data transmitter comprises: transmitting, to the data transmitter, a first data packet at a first time, wherein a TCP header for the first data packet indicates the first time; receiving, from the data transmitter, a second data packet at a second time in response to the first data packet, wherein a TCP header for the second data packet indicates the first time and the second time; and estimating the RTT based at least in part on a difference between the first time and the second time.

Aspect 8: The method of aspect 7, further comprising: throttling an acknowledgment rate for packets received over the network connection based at least in part on the type of the congestion control mechanism corresponding to a loss-based congestion control mechanism, wherein the modified connection parameters comprise the throttled acknowledgment rate.

Aspect 9: The method of any of aspects 5 through 6, wherein estimating the RTT between the data receiver and the data transmitter comprises: estimating the RTT based at least in part on an auto-regressive analysis of a plurality of data packets received from the data transmitter.

Aspect 10: The method of any of aspects 5 through 9, wherein estimating the congestion window size comprises: receiving one or more data packets from the data transmitter during the RTT; and estimating the congestion window size based at least in part on a quantity of the one or more data packets received during the RTT Aspect 11: The method of any of aspects 1 through 10, wherein measuring the plurality of congestion metrics comprises: measuring a packet loss rate associated with the data packets; and estimating whether the packet loss rate corresponds to OTA communications via the RAN, to the packet congestion, or both.

Aspect 12: The method of aspect 11, wherein modifying the one or more connection parameters of the network connection between the data receiver and the data transmitter is based at least in part on estimating that at least a portion of the packet loss rate corresponds to the packet congestion.

Aspect 13: The method of any of aspects 1 through 12, further comprising: receiving, from a network node of the RAN, a congestion notification message indicating a potential overflow of data packets in a buffer of the network node, wherein estimating the packet congestion at the data receiver is based at least in part on the congestion notification message.

Aspect 14: The method of any of aspects 1 through 13, wherein estimating the packet congestion comprises: estimating the packet congestion based at least in part on a learning model corresponding to a neural network-based machine learning algorithm, a reinforced learning-based machine learning algorithm, a statistical-based algorithm, or any combination thereof, wherein an input to the learning model comprises the plurality of congestion metrics.

Aspect 15: The method of any of aspects 1 through 14, wherein modifying the one or more connection parameters comprises: calculating the one or more modified connection parameters based at least in part on a learning model corresponding to a neural network-based machine learning algorithm, a reinforced learning-based machine learning algorithm, a statistical-based algorithm, or any combination thereof, wherein an input to the learning model comprises the estimated packet congestion.

Aspect 16: The method of any of aspects 1 through 15, wherein the one or more RAN congestion metrics associated with the RAN comprise a link rate associated with OTA communications via the RAN; and the one or more transport layer or application layer congestion metrics associated with the network connection between the data receiver and the data transmitter comprise a packet loss, an RTT, a BDP, a TCP header, or any combination thereof.

Aspect 17: An apparatus for wireless communication at a data receiver, comprising a processor; memory coupled with the processor; and instructions stored in the memory and executable by the processor to cause the apparatus to perform a method of any of aspects 1 through 16.

Aspect 18: An apparatus for wireless communication at a data receiver, comprising at least one means for performing a method of any of aspects 1 through 16.

Aspect 19: A non-transitory computer-readable medium storing code for wireless communication at a data receiver, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A data receiver, comprising:
one or more memories storing processor-executable code; and
one or more processors coupled with the one or more memories and individually or collectively operable to execute the code to cause the data receiver to:
measure a plurality of congestion metrics associated with receiving data packets at the data receiver from a data transmitter via a radio access network, wherein the plurality of congestion metrics comprise one or more physical layer radio access network congestion metrics associated with one or more radio access network communication links between the data receiver and one or more network entities of the radio access network, and wherein the plurality of congestion metrics comprises one or more transport layer or application layer congestion metrics associated with a network connection between the data receiver and the data transmitter, the data transmitter being different from the one or more network entities;
estimate a packet congestion at the data receiver according to the measured plurality of congestion metrics;
modify, based at least in part on the estimated packet congestion, one or more connection parameters of the network connection between the data receiver and the data transmitter; and
communicate with the data transmitter over the network connection in accordance with the modified connection parameters;
wherein:
the one or more physical layer radio access network congestion metrics associated with the radio access network communication links between the data receiver and one or more network entities of the radio access network comprise a link rate associated with over-the-air communications via the radio access network; and
the one or more transport layer or application layer congestion metrics associated with the network connection between the data receiver and the data transmitter comprise a packet loss, a round-trip-time, a bandwidth delay product, a transmission control protocol header, or any combination thereof;
wherein, to estimate the packet congestion at the data receiver, the one or more processors are individually or collectively further operable to execute the code to cause the data receiver to:
estimate one or more data transmitter side parameters associated with congestion control, the one or more data transmitter side parameters comprising one or more of: a congestion window size, a round-trip-time between the data receiver and the data transmitter, a bandwidth delay product, or any combination thereof;
estimate a type of congestion control mechanism at the data transmitter, a state of the congestion control mechanism at the data transmitter, or both based at least in part on the estimated one or more data transmitter side parameters;
throttle an acknowledgment rate for packets received over the network connection based at least in part on the type of the congestion control mechanism corresponding to a loss-based congestion control mechanism, wherein the modified connection parameters comprise the throttled acknowledgment rate.

2. The data receiver of claim 1, wherein, to communicate with the data transmitter, the one or more processors are individually or collectively further operable to execute the code to cause the data receiver to:
throttle an acknowledgment rate for packets received over the network connection, wherein the modified connection parameters comprise the throttled acknowledgment rate.

3. The data receiver of claim 1, wherein, to communicate with the data transmitter, the one or more processors are individually or collectively further operable to execute the code to cause the data receiver to:
transmit an acknowledgment to the data transmitter comprising an indication of an adjusted receiver window size that corresponds to a quantity of data packets and a time period, wherein the modified connection parameters comprise the adjusted receiver window size.

4. The data receiver of claim 3, wherein the one or more processors are individually or collectively further operable to execute the code to cause the data receiver to:
receive, from the data transmitter over the network connection, the quantity of data packets within the time period based at least in part on the indication of the adjusted receiver window size.

5. The data receiver of claim 1, wherein, to estimate the round-trip-time between the data receiver and the data transmitter, the one or more processors are individually or collectively further operable to execute the code to cause the data receiver to: transmit, to the data transmitter, a first data packet at a first time, wherein a transmission control protocol header for the first data packet indicates the first time; receive, from the data transmitter, a second data packet at a second time in response to the first data packet, wherein a transmission control protocol header for the second data packet indicates the first time and the second time; and estimate the round-trip-time based at least in part on a difference between the first time and the second time.

6. The data receiver of claim 1, wherein, to estimate the round-trip-time between the data receiver and the data transmitter, the one or more processors are individually or collectively further operable to execute the code to cause the data receiver to: estimate the round-trip-time based at least in part on an auto-regressive analysis of a plurality of data packets received from the data transmitter.

7. The data receiver of claim 1, wherein, to estimate the congestion window size, the one or more processors are individually or collectively further operable to execute the code to cause the data receiver to: receive one or more data packets from the data transmitter during the round-trip-time; and estimate the congestion window size based at least in part on a quantity of the one or more data packets received during the round-trip-time.

8. The data receiver of claim 1, wherein, to measure the plurality of congestion metrics, the one or more processors are individually or collectively further operable to execute the code to cause the data receiver to:
measure a packet loss rate associated with the data packets; and
estimate whether the packet loss rate corresponds to over-the-air communications via the radio access network, to the packet congestion, or both.

9. The data receiver of claim 8, wherein modifying the one or more connection parameters of the network connection between the data receiver and the data transmitter is based at least in part on estimating that at least a portion of the packet loss rate corresponds to the packet congestion.

10. The data receiver of claim 1, wherein the one or more processors are individually or collectively further operable to execute the code to cause the data receiver to:
receive, from a network node of the radio access network, a congestion notification message indicating a potential overflow of data packets in a buffer of the network node, wherein estimating the packet congestion at the data receiver is based at least in part on the congestion notification message.

11. The data receiver of claim 1, wherein, to estimate the packet congestion, the one or more processors are individually or collectively further operable to execute the code to cause the data receiver to:
estimate the packet congestion based at least in part on a learning model corresponding to a neural network-based machine learning algorithm, a reinforced learning-based machine learning algorithm, a statistical-based algorithm, or any combination thereof, wherein an input to the learning model comprises the plurality of congestion metrics.

12. The data receiver of claim 1, wherein, to modify the one or more connection parameters, the one or more processors are individually or collectively further operable to execute the code to cause the data receiver to:
calculate the one or more modified connection parameters based at least in part on a learning model corresponding to a neural network-based machine learning algorithm, a reinforced learning-based machine learning algorithm, a statistical-based algorithm, or any combination thereof, wherein an input to the learning model comprises the estimated packet congestion.

13. A method for wireless communication at a data receiver, comprising:
measuring a plurality of congestion metrics associated with receiving data packets at the data receiver from a data transmitter via a radio access network, wherein the plurality of congestion metrics comprise one or more physical layer radio access network congestion metrics associated with one or more radio access network communication links between the data receiver and one or more network entities of the radio access network, and wherein the plurality of congestion metrics comprises one or more transport layer or application layer congestion metrics associated with a network connection between the data receiver and the data transmitter, the data transmitter being different from the one or more network entities;
estimating a packet congestion at the data receiver according to the measured plurality of congestion metrics;
modifying, based at least in part on the estimated packet congestion, one or more connection parameters of the network connection between the data receiver and the data transmitter; and communicating with the data transmitter over the network connection in accordance with the modified connection parameters;

wherein:
the one or more physical layer radio access network congestion metrics associated with the radio access network communication links between the data receiver and one or more network entities of the radio access network comprise a link rate associated with over-the-air communications via the radio access network; and the one or more transport layer or application layer congestion metrics associated with the network connection between the data receiver and the data transmitter comprise a packet loss, a round-trip-time, a bandwidth delay product, a transmission control protocol header, or any combination thereof;

wherein estimating the packet congestion at the data receiver comprises:
estimating one or more data transmitter side parameters associated with congestion control, the one or more data transmitter side parameters comprising one or more of: a congestion window size, a round-trip-time between the data receiver and the data transmitter, a bandwidth delay product, or any combination thereof;

estimating a type of congestion control mechanism at the data transmitter, a state of the congestion control mechanism at the data transmitter, or both based at least in part on the estimated one or more data transmitter side parameters;

throttling an acknowledgment rate for packets received over the network connection based at least in part on the type of the congestion control mechanism corresponding to a loss-based congestion control mechanism, wherein the modified connection parameters comprise the throttled acknowledgment rate.

14. The method of claim 13, wherein communicating with the data transmitter comprises:
throttling an acknowledgment rate for packets received over the network connection, wherein the modified connection parameters comprise the throttled acknowledgment rate.

15. The method of claim 13, wherein communicating with the data transmitter comprises:
transmitting an acknowledgment to the data transmitter comprising an indication of an adjusted receiver window size that corresponds to a quantity of data packets and a time period, wherein the modified connection parameters comprise the adjusted receiver window size.

16. The method of claim 15, further comprising:
receiving, from the data transmitter over the network connection, the quantity of data packets within the time period based at least in part on the indication of the adjusted receiver window size.

17. The method of claim 13, wherein estimating the round-trip-time between the data receiver and the data transmitter comprises: transmitting, to the data transmitter, a first data packet at a first time, wherein a transmission control protocol header for the first data packet indicates the first time; receiving, from the data transmitter, a second data packet at a second time in response to the first data packet, wherein a transmission control protocol header for the second data packet indicates the first time and the second time; and estimating the round-trip-time based at least in part on a difference between the first time and the second time.

18. The method of claim 13, wherein estimating the round-trip-time between the data receiver and the data transmitter comprises: estimating the round-trip-time based at least in part on an auto-regressive analysis of a plurality of data packets received from the data transmitter.

19. The method of claim 13, wherein estimating the congestion window size comprises: receiving one or more data packets from the data transmitter during the round-trip-time; and estimating the congestion window size based at least in part on a quantity of the one or more data packets received during the round-trip-time.

20. The method of claim 13, wherein measuring the plurality of congestion metrics comprises:
measuring a packet loss rate associated with the data packets; and
estimating whether the packet loss rate corresponds to over-the-air communications via the radio access network, to the packet congestion, or both.

21. The method of claim 20, wherein modifying the one or more connection parameters of the network connection between the data receiver and the data transmitter is based at least in part on estimating that at least a portion of the packet loss rate corresponds to the packet congestion.

22. A non-transitory computer-readable medium storing code for wireless communication at a data receiver, the code comprising instructions executable by one or more processors to:
measure a plurality of congestion metrics associated with receiving data packets at the data receiver from a data transmitter via a radio access network, wherein the plurality of congestion metrics comprise one or more physical layer radio access network congestion metrics associated with one or more radio access network communication links between the data receiver and one or more network entities of the radio access network, and wherein the plurality of congestion metrics comprises one or more transport layer or application layer congestion metrics associated with a network connection between the data receiver and the data transmitter, the data transmitter being different from the one or more network entities;

estimate a packet congestion at the data receiver according to the measured plurality of congestion metrics;
modify, based at least in part on the estimated packet congestion, one or more connection parameters of the network connection between the data receiver and the data transmitter; and
communicate with the data transmitter over the network connection in accordance with the modified connection parameters;

wherein:
the one or more physical layer radio access network congestion metrics associated with the radio access network communication links between the data receiver and one or more network entities of the radio access network comprise a link rate associated with over-the-air communications via the radio access network; and the one or more transport layer or application layer congestion metrics associated with the network connection between the data receiver and the data transmitter comprise a packet loss, a round-trip-time, a bandwidth delay product, a transmission control protocol header, or any combination thereof;

wherein estimating the packet congestion at the data receiver comprises:
- estimating one or more data transmitter side parameters associated with congestion control, the one or more data transmitter side parameters comprising one or more of: a congestion window size, a round-trip-time between the data receiver and the data transmitter, a bandwidth delay product, or any combination thereof;
- estimating a type of congestion control mechanism at the data transmitter, a state of the congestion control mechanism at the data transmitter, or both based at least in part on the estimated one or more data transmitter side parameters;

throttling an acknowledgment rate for packets received over the network connection based at least in part on the type of the congestion control mechanism corresponding to a loss-based congestion control mechanism, wherein the modified connection parameters comprise the throttled acknowledgment rate.

* * * * *